(12) United States Patent
Aslan et al.

(10) Patent No.: US 11,610,500 B2
(45) Date of Patent: Mar. 21, 2023

(54) ADAPTIVE LEARNING ENVIRONMENT DRIVEN BY REAL-TIME IDENTIFICATION OF ENGAGEMENT LEVEL

(71) Applicant: Tahoe Research, Ltd., Dublin (IE)

(72) Inventors: Sinem Aslan, Istanbul (TR); Asli Arslan Esme, Istanbul (TR); Gila Kamhi, Zichron Yaakov (IL); Ron Ferens, Ramat Hasharon (IL); Itai Diner, Misgav (IL)

(73) Assignee: Tahoe Research, Ltd., Dublin (IE)

( * ) Notice: Subject to any disclaimer, the term of this patent is extended or adjusted under 35 U.S.C. 154(b) by 813 days.

(21) Appl. No.: 16/019,182

(22) Filed: Jun. 26, 2018

(65) Prior Publication Data

US 2018/0308376 A1 Oct. 25, 2018

Related U.S. Application Data

(62) Division of application No. 14/325,740, filed on Jul. 8, 2014, now Pat. No. 10,013,892.

(Continued)

(51) Int. Cl.
*G09B 5/08* (2006.01)
*G06Q 50/00* (2012.01)
(Continued)

(52) U.S. Cl.
CPC .............. *G09B 5/08* (2013.01); *G06Q 50/01* (2013.01); *G09B 19/00* (2013.01); *H04L 67/30* (2013.01); *H04L 67/535* (2022.05)

(58) Field of Classification Search
CPC .................................. G09B 5/08; G09B 19/00
See application file for complete search history.

(56) References Cited

U.S. PATENT DOCUMENTS 7,181,693 B1 2/2007 Anderson et al.
7,452,336 B2 11/2008 Thompson
(Continued)

FOREIGN PATENT DOCUMENTS

CN 102696052 A 9/2012
CN 102822882 A 12/2012
(Continued)

OTHER PUBLICATIONS

Office Action dated Jul. 18, 2019 for Chinese Patent Application No. 201480049209.5, 21 pages.
(Continued)

*Primary Examiner* — David E Choi
(74) *Attorney, Agent, or Firm* — Studebaker & Brackett PC

(57) ABSTRACT

Computer-readable storage media, computing devices, and methods associated with an adaptive learning environment associated with an adaptive learning environment are disclosed. In embodiments, a computing device may include an instruction module and an adaptation module operatively coupled with the instruction module. The instruction module may selectively provide instructional content of one of a plurality of instructional content types to a user of the computing device via one or more output devices coupled with the computing device. The adaptation module may determine, in real-time, an engagement level associated with the user of the computing device and may cooperate with the instruction module to dynamically adapt the instructional content provided to the user based at least in part on the engagement level determined. Other embodiments may be described and/or claimed.

20 Claims, 9 Drawing Sheets

Related U.S. Application Data

(60) Provisional application No. 61/887,766, filed on Oct. 7, 2013.

(51) Int. Cl.
*G09B 19/00* (2006.01)
*H04L 67/30* (2022.01)
*H04L 67/50* (2022.01)

(56) References Cited

U.S. PATENT DOCUMENTS

| | | | |
|---|---|---|---|
| 7,669,056 B2 | 2/2010 | Frank et al. | |
| 8,769,557 B1* | 7/2014 | Terrazas | H04N 21/4223 |
| | | | 725/12 |
| 9,483,736 B2* | 11/2016 | Wan | G06N 5/04 |
| 11,290,686 B2* | 3/2022 | Peters | H04N 7/147 |
| 2002/0083025 A1 | 6/2002 | Robarts et al. | |
| 2003/0167167 A1 | 9/2003 | Gong | |
| 2003/0186208 A1 | 10/2003 | Wen et al. | |
| 2004/0210159 A1 | 10/2004 | Kibar | |
| 2005/0223237 A1 | 10/2005 | Barletta et al. | |
| 2006/0143647 A1 | 6/2006 | Bill | |
| 2006/0166174 A1 | 7/2006 | Rowe et al. | |
| 2007/0033634 A1 | 2/2007 | Leurs et al. | |
| 2007/0150281 A1 | 6/2007 | Hoff | |
| 2007/0218432 A1 | 9/2007 | Glass et al. | |
| 2008/0052080 A1 | 2/2008 | Narayanan | |
| 2009/0079547 A1 | 3/2009 | Oksanen et al. | |
| 2010/0088154 A1* | 4/2010 | Vailaya | G06Q 30/0251 |
| | | | 705/7.29 |
| 2010/0162135 A1* | 6/2010 | Wanas | G06Q 10/10 |
| | | | 715/753 |
| 2010/0211966 A1 | 8/2010 | Zhang et al. | |
| 2011/0053123 A1 | 3/2011 | Lonsdale | |
| 2011/0263946 A1 | 10/2011 | el Kaliouby et al. | |
| 2012/0041917 A1 | 2/2012 | Newton et al. | |
| 2012/0052476 A1 | 3/2012 | Graesser et al. | |
| 2012/0136219 A1 | 5/2012 | Huang et al. | |
| 2012/0290950 A1 | 11/2012 | Rapaport et al. | |
| 2012/0297074 A1* | 11/2012 | Mo | H04W 76/10 |
| | | | 709/227 |
| 2013/0038737 A1 | 2/2013 | Yehezkel et al. | |
| 2013/0059276 A1 | 3/2013 | Allen et al. | |
| 2013/0191319 A1 | 7/2013 | Biehl et al. | |
| 2013/0260361 A1* | 10/2013 | Mutlu | G16H 20/70 |
| | | | 434/365 |
| 2014/0086554 A1 | 3/2014 | Yehezkel et al. | |
| 2014/0094156 A1 | 4/2014 | Uusitalo et al. | |
| 2014/0096077 A1 | 4/2014 | Jacob et al. | |
| 2014/0164102 A1* | 6/2014 | Bell | G06Q 30/0255 |
| | | | 705/14.45 |
| 2014/0189720 A1* | 7/2014 | Terrazas | H04N 21/41265 |
| | | | 725/12 |
| 2014/0205984 A1 | 7/2014 | Chapman | |
| 2014/0205990 A1* | 7/2014 | Wellman | G09B 7/00 |
| | | | 434/362 |
| 2014/0208263 A1* | 7/2014 | Maklouf | G06T 11/203 |
| | | | 715/802 |
| 2014/0236953 A1 | 8/2014 | Rapaport et al. | |
| 2014/0249897 A1* | 9/2014 | Znerold | G06Q 30/0241 |
| | | | 705/14.4 |
| 2014/0341473 A1* | 11/2014 | Lee | G06V 40/193 |
| | | | 382/195 |
| 2014/0351100 A1* | 11/2014 | Kapoor | G06Q 50/20 |
| | | | 705/28 |
| 2014/0365208 A1 | 12/2014 | De Choudhury et al. | |
| 2015/0095145 A1* | 4/2015 | Shulman | G06F 16/9535 |
| | | | 705/14.62 |
| 2015/0099255 A1 | 4/2015 | Aslan et al. | |
| 2015/0332603 A1 | 11/2015 | Aravkin et al. | |
| 2015/0341411 A1* | 11/2015 | Huber | H04L 67/02 |
| | | | 709/231 |
| 2016/0055410 A1 | 2/2016 | Spagnola | |
| 2016/0180722 A1 | 6/2016 | Yehezkel et al. | |
| 2017/0039876 A1 | 2/2017 | Alyuz Civitci et al. | |
| 2018/0308376 A1* | 10/2018 | Aslan | G06Q 50/01 |
| 2021/0185276 A1* | 6/2021 | Peters | H04N 7/147 |

FOREIGN PATENT DOCUMENTS

| | | |
|---|---|---|
| CN | 103190902 A | 7/2013 |
| CN | 103339649 A | 10/2013 |
| JP | 20051199403 A | 7/2005 |
| KR | 10-2009-0092642 A | 9/2009 |
| KR | 10-2009-0107573 A | 10/2009 |
| KR | 10-1002751 B1 | 12/2010 |
| KR | 10-1118276 B1 | 3/2012 |
| WO | WO200940696 A1 | 4/2009 |
| WO | WO20117045422 A1 | 4/2011 |
| WO | WO2016105637 A1 | 6/2016 |

OTHER PUBLICATIONS

Office Action dated Feb. 12, 2019 for Chinese Patent Application No. 201480049209.5, 25 pages.

Office Action dated Apr. 3, 2020 for Chinese Patent Application No. 201480049209.5, 8 pages.

Office Action dated Sep. 25, 2018 for U.S. Appl. No. 14/820,297, 71 pages.

International Search Report & Written Opinion dated Dec. 18, 2014 for International Application No. PCT/US2014/054587, 11 pages.

Arapakis, I., "Affect-Based information retrieval" (Doctoral dissertation, University of Glasgow), 2010, 196 pages.

Complex Learning and Difficulties Research Project. (2013). Engagement Ladder. Retrieved from http://complexid.ssatrust.org.uk/uploads/engagement_ladder%202.pdf, 1 page.

Donato, G., Bartlett, M. S., Hager, J. C., Ekman, P., & Sejnowski, T. J., "Classifying facial actions." Pattern Analysis and Machine Intelligence, IEEE Transactions on, 21(10), 1999, pp. 974-989.

Fredricks, J. A., Blumenfeld, P. C., and Paris, A., "School engagement potential of the concept state of the evidence." Review of Educational Research, 74, 2004, pp. 59-119.

Fredricks, J., McColskey, W., Meli, J., Montrosse, B., Mordica, J., & Mooney, K., "Measuring student engagement in upper elementary through high school: A description of 21 instruments." Issues & Answers Report, REL, 98, 098, 2011, 88 pages.

Galameau, L., "Authentic Learning Experiences Through Play: Games, Simulations and the Construction of Knowledge Paper," presented at the DiGRA. 2005, 9 pages.

Grafsgaard, J. F., Boyer, K. E., Wiebe, E. N., & Lester, J. C., "Analyzing Posture and Affect in Task-Oriented Tutoring." In FLAIRS Conference, May 2012, 6 pages.

Grafsgaard, J. F., Boyer, K. E., Fulton, R. M.. Boyer, K. E., Wiebe, E. N., & Lester, J. C., "Multimodal analysis of the implicit affective channel in computer-mediated textual communication." In Proceedings of the 14th ACM international conference on Multimodal interaction (pp. 145-152). ACM, Oct. 2012, 8 pages.

Gunes, H., & Piccardi, M., "Bi-modal emotion recognition from expressive face and body gestures." Journal of Network and Computer Applications, 30(4), 2007, pp. 1334-1345.

Hardy, M., Wiebe, E. N.. Grafsgaard, J. F., Boyer, K. E., & Lester, J. C., "Physiological Responses to Events during Training: Use of Skin Conductance to Inform Future Adaptive Learning Systems," 2013, 5 pages.

Hargreaves, D. H., "A new shape for schooling. Specialist Schools and Academies Trust," 2006, 17 pages.

Jones, M. G., "Creating Electronic Learning Environments: Games, Flow, and the User Interface. Paper presented at the National Convention of the Association for Educational Communications and Technology (AECT)," 1998, 13 pages.

Karimi, A., & Lim, Y. P., "Children, engagement and enjoyment in digital narrative." Curriculum, technology & transformation for an unknown future. Proceedings ascilite Sydney, 2010, pp. 475-483.

Kunze, K., Utsumi, Y., Shiga, Y., Kise, K., & Bulling, A., "I know what you are reading: recognition of document types using mobile

(56) References Cited

OTHER PUBLICATIONS eye tracking." In Proceedings of the 17th annual international symposium on International symposium on wearable computers, Sep. 2013, pp. 113-116. ACM.

Nes, L. S., Segerstrom, S. C., & Sephton, S. E., "Engagement and arousal: Optimism's effects during a brief stressor." Personality and Social Psychology Bulletin, 31(1), 2005, pp. 111-120.

Pantic, M., & Rothkrantz, L. J., "Toward an affect-sensitive multimodal human-computer interaction." Proceedings of the IEEE. 91(9), 2003, pp. 1370-1390.

Pantic, M., & Patras, I., "Dynamics of facial expression: recognition of facial actions and their temporal segments from face profile image sequences." Systems, Man, and Cybernetics, Part B: Cybernetics, IEEE Transactions on,36(2), 2006, pp. 433-449.

Pecchinenda, A., "The affective significance of skin conductance activity during a difficult problem-solving task." Cognition & Emotion, 10(5), 1996, pp. 481-504.

Sciulli, L., Bhagat, P., & Bebko, C., "Eye tracking analysis: Engagement levels and donor tendencies using print advertisements with emotional appeals." Innovative Marketing, 8(2), 2012, pp. 91-98.

Sanchez, A., Vazquez, C., Marker, C., LeMoult, J., & Joormann, J., "Attentional disengagement predicts stress Yecovery in depression: An eye-tracking study." Journal of abnormal psychology, 122(2), 12013, 11 pages.

Tian, Y. I., Kanade, T., & Cohn, J. F., "Recognizing action units for facial expression analysis. Pattern Analysis and Machine Intelligence," IEEE Transactions on, 23(2), 2001, pp. 97-115.

Trowler, V. & Trowler, P., "Student engagement evidence summary." Retrieved from http://www.heacademy.ac.uk/assets/documents/studentengagement/StudentEngagementEvidence Summary.pdf, 2010, 30 pages.

"The Knewtonw Platform—Leading Adaptive Learning Provider", http://www.knewton.com/platform, retrieved Dec. 19, 2014, 4 pages.

"About Khan Academy—Khan Academy—A personalized learning resource for all ages", http://www.khanacademy.org/about, retrieved Dec. 19, 2014, 5 pages.

Raanan Yehezkel et al., "System and Methods for Self-Learing, Content-Aware Affect Recognition", U.S. Appl. No. 14/578,623, filed Dec. 22, 2014, 35 pages.

International Preliminary Reporton Patentability dated Apr. 21, 2016 for International Application No. PCT/US2014/054587, 8 pages.

International Search Report and Written Opinion dated Feb. 23, 2016 for International Application PCT/US2015/054976, 12 pages.

Office Action dated Jan. 11, 2017 for U.S. Appl. No. 14/578,623, 26 pages.

Final Office Action dated May 10, 2017 for U.S. Appl. No. 14/578,623, 22 pages.

Office Action dated Nov. 16, 2017 for U.S. Appl. No. 14/578,623, 23 pages.

Final Office Action dated May 16, 2019 for U.S. Appl. No. 14/820,297, 28 pages.

\* cited by examiner

Non-transitory computer-readable storage medium
902

Programming Instruction 904
configured to cause a computing device, in response to execution of the programming instructions, to practice one or more operations of the methods described in reference to Figures 1-7.

FIG. 9

ADAPTIVE LEARNING ENVIRONMENT DRIVEN BY REAL-TIME IDENTIFICATION OF ENGAGEMENT LEVEL

CROSS-REFERENCE TO RELATED APPLICATIONS

This application is a divisional of and claims priority to U.S. patent application Ser. No. 14/325,740, entitled "ADAPTIVE LEARNING ENVIRONMENT DRIVEN BY REAL-TIME IDENTIFICATION OF ENGAGEMENT LEVEL" filed Jul. 8, 2014 which claims the benefit of U.S. Provisional Application No. 61/887,766, filed Oct. 7, 2013, entitled "ADAPTIVE LEARNING ENVIRONMENT DRIVEN BY REAL TIME IDENTIFICATION OF LEARNER STATES," each of which is hereby incorporated by reference in their entireties.

TECHNICAL FIELD

The present disclosure relates to the field of computing, in particular, to apparatuses, methods, and storage media associated with an adaptive learning environment driven by real-time determination of engagement levels.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In a traditional classroom today, a teacher is often the main source of information. The teacher may present a single type of instructional content to any number of students and is forced to present this instructional content at a single pace, despite learning differences (e.g., learning styles, preferences, attitudes, and knowledge deficiencies), dynamically changing learner states (e.g., mood, emotions, and motivation), and other contextual variables affecting learners (e.g., environmental conditions—such as weather, light, and noise). All of the students in the classroom are forced to learn at the same pace with the same type of instructional content and conditions. Putting an emphasis on a time-based and one-size-fits-all approach, it is assumed that at the end of sixty minutes of group instruction, all of the students of the group will acquire necessary learning gains, and will be ready to move on to the next topic or unit in the course. With this unrealistic assumption, some students are forced to move on without fully mastering the current instructional content—resulting in an accumulation of learning deficiencies. In such a scenario, students who learn at a faster pace may have to wait for students who learn at a slower pace, before being able to move on to the next topic or unit in the course. Similarly, students who learn at a slower pace may be forced to move through the instructional content at a pace that exceeds their capability and, as a result, these students may not be able to devote sufficient time to gaining a mastery of the instructional content. Furthermore, at the end, the teacher implements a measurement designed to evaluate student performances, which often reveals achievement differences among the students as a result of the time-based, one-size-fits-all approach.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 9 illustrates an example storage medium with instructions configured to enable a computing device to practice the present disclosure, in accordance with various embodiments.

DETAILED DESCRIPTION

Figure 1:
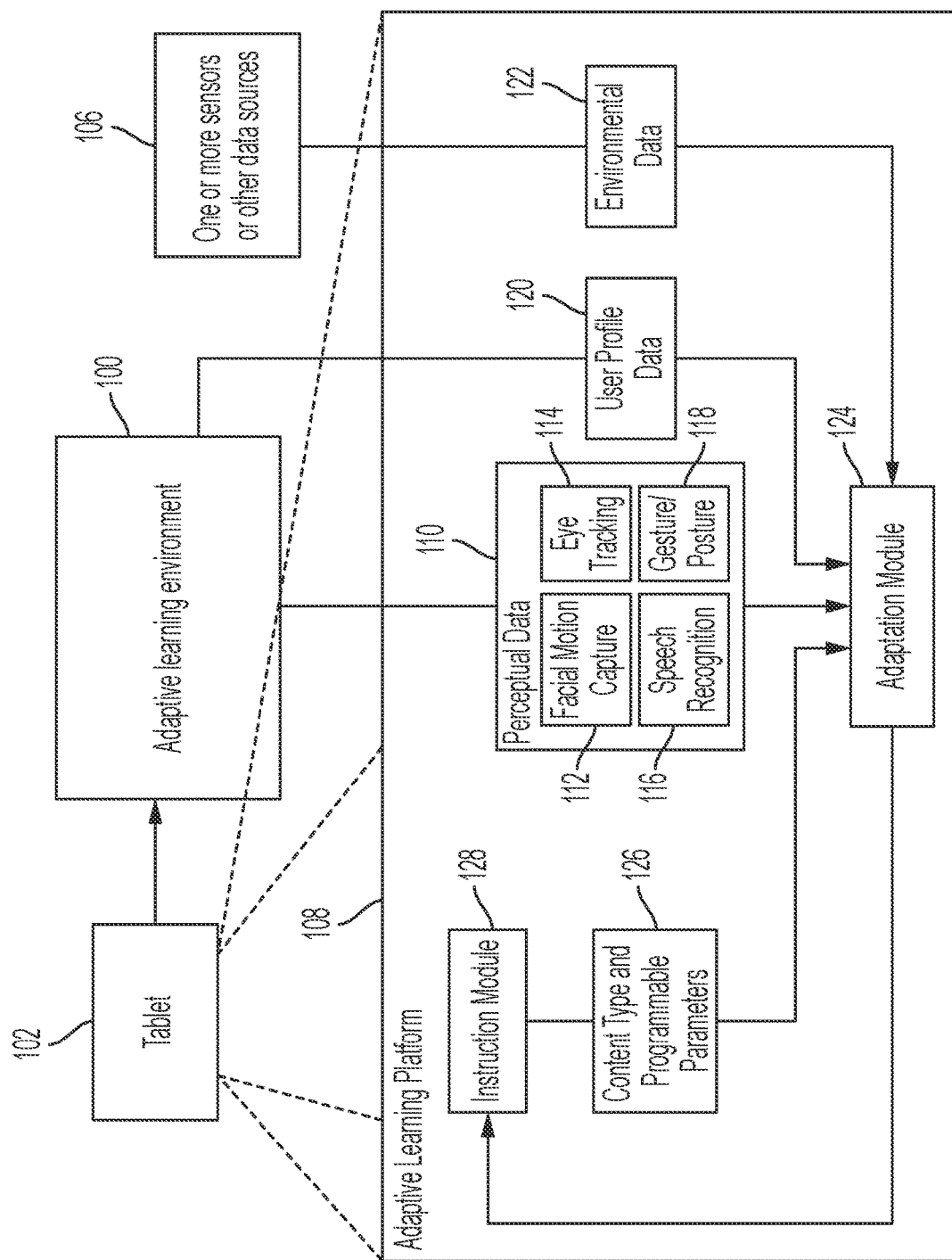
FIG. 1 illustrates an adaptive learning environment of the present disclosure, in accordance with various embodiments of the present disclosure.

Computing devices, methods, and computer-readable storage media for an adaptive learning platform are described herein. In embodiments, the computing device may include an instruction module and an adaptation module operatively coupled with the instruction module. The instruction module may selectively provide instructional content of one of a plurality of instructional content types to a user of the computing device via one or more output devices coupled with the computing device. The adaptation module may determine, in real-time, an engagement level associated with the user of the computing device and may cooperate with the instruction module to dynamically adapt the instructional content provided to the user based at least in part on the engagement level determined. For example, the instruction module may present instructional content to the user in the form of a multimedia presentation. During the multimedia presentation, the adaptation module may monitor an engagement level of the user. If the adaptation module determines that the user's engagement level is decreasing, the adaptation module may cooperate with the instruction module to adapt the instructional content presentation to an interactive presentation, such as a game, in an effort to increase the engagement level of the user.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split, or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable component(s) that provide the described functionality.

FIG. 1 illustrates an adaptive learning environment 100 in accordance with various embodiments of the present disclosure. As depicted, adaptive learning environment 100 may include a computing device, such as tablet 102, configured to output instructional content to a user of tablet 102. In embodiments, tablet 102 may include, or be communicatively coupled with, an adaptive learning platform 108. In embodiments, adaptive learning platform 108 may attempt to improve the user's performance in a personalized learning space. Because the user's performance may be correlated with the user's engagement level, adaptive learning platform 108 may utilize the engagement level of the user when making a decision about adapting the instructional content in the personalized learning space. As such, adaptive learning platform 108 may be configured with logic to dynamically adapt the instructional content output to a user based on a determined engagement level of the user. This logic may be contained in one or more modules, such as adaptation module 124 and instruction module 128. In embodiments, instruction module 128 may be configured to provide instructional content to the user of tablet 102, and adaptation module 124 may be configured to determine a current engagement level of the user. In some embodiments, adaptation module 124 may further be configured to cooperate with instruction module 128 to dynamically adapt the instructional content based at least in part on the engagement level determined. Adaptation module 124 may be configured to receive various types of user state data that may be utilized in determining a current engagement level of the user. In embodiments, the various types of user state data may include perceptual data 110, user profile data 120, and/or environmental data 122.

Perceptual data 110 may be collected in real-time by one or more sensors of adaptive learning environment 100 and may include a variety of data associated with a current state of the user. Such sensors may include, but are not limited to, one or more cameras capable of capturing images or video in two dimensions or three dimensions, one or more microphones, a skin conductance sensor, eye tracking sensor, and/or a heart rate sensor. These sensors may be incorporated within tablet 102 or may be communicatively coupled with one or more communication interfaces of tablet 102. For example, adaptive learning environment 100 may include sensors, such as those listed above, capable of producing data to be used in facial motion capture 112, eye tracking 114, speech recognition 116, and/or gesture/posture 118.

User profile data 120 may, according to some embodiments, be static data previously defined by an administrator of adaptive learning environment 100, such as, for example, a teacher in a classroom setting. User profile data 120 may be associated with the individual user of tablet 102 and may contain characterizing parameters associated with the student. As such, the user profile data 120 may be selected based upon a user authentication mechanism such as through biometric information (e.g., facial recognition) or any other suitable authentication mechanism (e.g., username and password, etc.). In embodiments, these characterizing parameters may include parameters associated with an engagement level of the user. For instance, the teacher may notice that one or more environmental factors may either increase or decrease the student's level of engagement. For example, if the teacher regularly notices that the student's level of engagement appears to be reduced after lunch, the teacher may enter this into the user's profile. Such characterizing parameters may include, but are not limited to, a time of day, temperature, weather, and/or subject matter, and may also include engagement levels associated with one or more of these characterizing parameters.

In addition, these characterizing parameters may indicate a preferred scaffolding, or tutoring, structure for the student. For example, if the student responds better to peer tutoring than the student does to machine tutoring or tutoring from the teacher, the teacher could designate this as a characterizing parameter. In another example, the teacher may be able to designate one or more specific peer tutors whom the student may respond particularly well to tutoring from. In some embodiments, these one or more specific peer tutors may be subject matter specific. For example, one peer tutor may be designated for math tutoring, while another peer tutor may be designated for science tutoring.

Environmental data 122 may be collected in real-time by one or more sensors or other data sources 106 accessible by the adaptive learning platform 108. Environmental data 122 may include a variety of data associated with the environment in which the user is located. Such sensors or data sources may include, but are not limited to, an ambient light sensor to generate data associated with lighting conditions, an ambient noise sensor to generate data associated with a noise level of the environment, a temperature sensor to generate temperature data, a humidity sensor to generate data associated with humidity of the environment, various weather-related data sources, time and day data sources, etc. These sensors and data sources may be incorporated within tablet 102 or may be communicatively coupled with one or more communication interfaces of tablet 102.

The above discussed types of user state data, and any other data suitable for determining an engagement level of the user, may be provided to adaptation module 124. Adaptation module 124 may be configured to receive these types of user state data and may process the user state data to determine an engagement level of the user. The determination of the engagement level of the user is discussed further in reference to FIGS. 2 and 3 below.

While the user interacts with adaptive learning platform 108, adaptation module 124 may continuously monitor one or more of the three different data types discussed above for indicators of the user's current engagement level. Adaptation module 124 may also be configured to receive, and instruction module 128 may be configured to transmit, an indicator of content type and programmable parameters 126 associated with the instructional content. In embodiments, the content type may be associated with a type of instructional content and the programmable parameters may indicate the parameters that may be used in adapting the instructional content. Adaptation module 124 may be configured to correlate a current content type with the indicators of the current engagement level to develop an evolving user state model. In embodiments, the evolving user state model may be utilized to better determine an engagement level of the user and an adaptation to the instructional content, specific to the user, which may increase the engagement level.

As the user continues to interact with adaptive learning platform 108, adaptation module 124 may be configured to determine a change in the user's level of engagement. In some embodiments, once the user's engagement level decreases below a predefined threshold, the adaptation module 124 may be configured to cooperate with instruction module 128 to adapt the instructional content by notifying instruction module 128 of the decrease in the user's engagement level and/or utilizing the programmable parameters to cause instruction module 128 to adapt the instructional content. The above described process may repeat for the duration of the user's utilization of adaptive learning platform 108.

Figure 2:
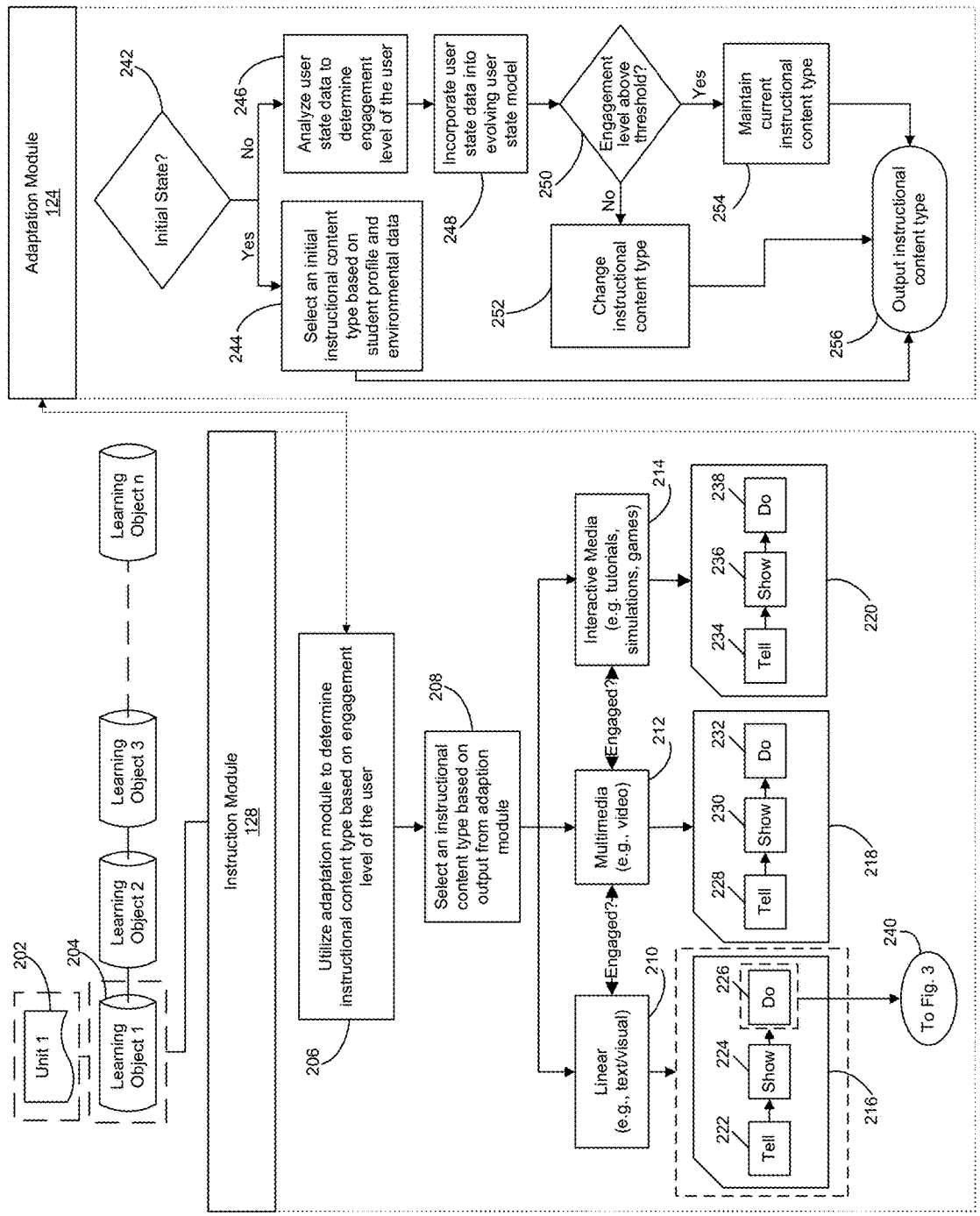
FIGS. 2 and 3 illustrate the operational logic of the adaptive learning platform of FIG. 1 in further detail, in accordance with various embodiments of the present disclosure.
Figure 3:
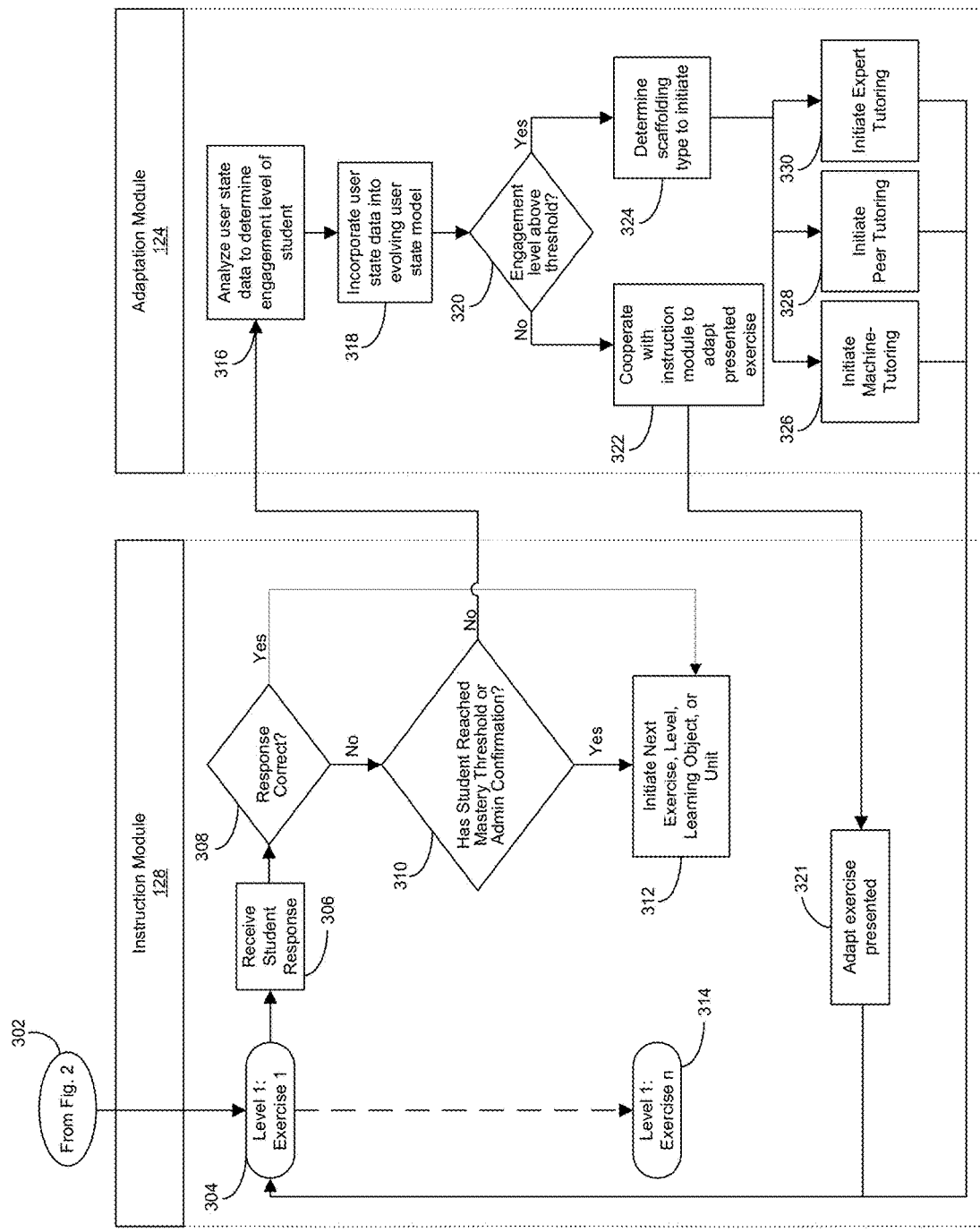

FIGS. 2 and 3 illustrate the operational logic and associated process flows of adaptive learning platform 108, in accordance with various embodiments. As shown, in embodiments, an instructional course may be divided into one or more units 202. Each unit 202 may correspond with a terminal learning objective to be accomplished at the end of the learning experience. Similarly, each unit 202 may be further broken down into learning objects 204 (e.g., learning objects 1-n) that may correspond with enabling learning objectives of the terminal learning objective. For example, Unit 1 may be a portion of a mathematics instructional course. In such an example, Unit 1 may be directed at multiplication of numbers as a terminal learning objective, and learning object 1 may be directed at an enabling learning objective of multiplication of two single-digit numbers, learning object 2 may be directed at an enabling learning objective of multiplication of a two-digit number by a single-digit number, and so on in an order of increasing complexity.

In embodiments, instruction module 128 of FIG. 1 may be utilized to present instructional content to a user, and adaptation module 124 may be configured to determine an engagement level of a user and cooperate with instruction module 128 to dynamically adapt the instructional content provided to the user based at least in part on the determined engagement level. The process flow may begin at block 206 where instruction module 128 may cooperate with adaptation module 124 to determine an instructional content type. In response, adaptation module 124 may first make a determination at block 242 of whether or not adaptation module 124 is in an initial state. In embodiments, an initial state may be a state where an initial instructional content type has yet to be determined. If adaptation module 124 is in an initial state, the process may proceed to block 244 where an initial instructional content type is determined. In embodiments, this initial instructional content type may be determined based at least in part on student profile data and any available environmental data. In some embodiments, the selection of an initial instructional content type may be further based on an evolving user state model, such as that discussed elsewhere herein. For example, if the user profile indicates that the user demonstrates a higher level of engagement with interactive media in the afternoon and the environmental data indicates that the current time period is in the afternoon, the initial instructional content type may be determined to be interactive media. In embodiments where an evolving user state model is available, the user state model may more precisely correlate an instructional content type with the available environmental data. In such instances, the evolving user state model may be utilized in place of or in addition to the user profile. In embodiments, the user profile, or any individual characterizing parameters of the user profile, may designate whether an evolving user state model is to override the user profile or whether the user profile is to override the evolving user state model in instances where the evolving user state model and the user profile may conflict. After determining the initial instructional content type, the process may proceed to block 256 where the instructional content type is output to instruction module 128 to be utilized in selecting the instructional content type to output to the user.

Returning to block 242, if adaptation module 124 is not in an initial state, the process may proceed to block 246 where user state data is analyzed to determine a real-time engagement level of the user. In some embodiments, an engagement level of the user may be determined to be a selected one of a plurality of engagement levels. This plurality of engagement levels may include one or more of fully engaged, mostly engaged, partly engaged, fleetingly engaged, or not engaged. As used herein, fully engaged may indicate that the user is completely engaged or that the user is devoting full or almost full attention to the instructional content; mostly engaged may indicate that the user is engaged a majority of the time or that the user's attention is devoted to the instructional content more than the user's attention is devoted elsewhere; partly engaged may indicate that the user is engaged unpredictably or intermittently; fleetingly engaged may indicate that the user's engagement is low or almost nonexistent; and not engaged indicates that the user is inattentive or unresponsive to the instructional content.

In embodiments, the determined engagement level may be based on any number of measurable external indicators exhibiting that the user is engaged because a user who is engaged will be more successful at building new knowledge when experiencing the instructional content than a user who is not. These measurable external indicators may be associated with a plurality of types of engagement such as behavioral engagement, cognitive engagement, and/or emotional engagement. As used herein, behavioral engagement may correspond to effort, persistence, attention, and/or participation; cognitive engagement may correspond with a commitment by the user to understand the instructional content or any other form of psychological investment in the instructional content; and emotional engagement may correspond with the feelings of the user with respect to the learning process, such as fun, excitement, and/or enjoyment, for example.

Table 1 demonstrates an illustrative framework for measuring a user's engagement throughout a learning process.

Table 1 outlines the user's engagement characteristics along with a type of engagement, possible indicators for engagement, things to observe to measure engagement, associated user state parameters, and the sensors associated with those user state parameters, if any.

cient associated with the respective engagement characteristic. The engagement coefficient may indicate a weight to assign to the respective engagement characteristic. In the function above, $\alpha$, $\beta$, $\gamma$, $\delta$, and $\epsilon$ may be engagement coefficients. In embodiments, the engagement coefficients

TABLE 1

Measuring User Engagement

| Engagement Type | Engagement Characteristics | Engagement Indicators | Observable Indicators | User State Data Parameters/Associated Sensors (if any) |
|---|---|---|---|---|
| Behavioral | Positive body language | Interest and attention | Body posture, eye contact, head position, leaning forward or backward, and positions of arms | Body posture, head pose, and hand gesture/2D and 3D camera |
| Behavioral | Consistent focus | Focus and attention | Student's focus on the learning activity with minimum disruptions | Eye tracking including pupil dilation. See Table 2 showing how we can make the correlation of the student's interest to content based on eye tracking parameters/2D camera with eye tracker |
| Behavioral | Verbal participation | Participation, sharing ideas, and reflecting on learning | Student's expression of thoughtful ideas and answers | Text and speech recognition (e.g., evaluation of posts in a discussion forum)/microphone |
| Cognitive | Student confidence | Self-regulation | Student's confidence in initiating and completing a task with limited scaffolding | Number of times scaffolding, or tutoring, is used during learning experience |
| Emotional | Fun and excitement | Interest and enthusiasm | Student's demonstration of positive feelings about learning | Facial expression, emotion analysis, speech recognition, and skin conductance/2D camera, microphone, and skin conductance sensor |

In embodiments, adaptation module 124 may be configured to collect or receive data from any number of sensors including, but not limited to, a 2D camera, 3D camera, which may be utilized to add depth data to each frame/image acquired by the 2D camera, eye tracker, skin conductance sensor, heart rate monitor, etc. Body posture and hand gesture extraction algorithms may be utilized and may be based, for example, on the depth data from the 3D camera. Head pose and facial expression algorithms may be utilized and may be based, for example, on the data acquired by the 2D camera. Eye gaze and region of focus algorithms may be utilized and may be based, for example, on eye tracking hardware. Arousal and excitement data may be utilized and may be based, for example, on pupil dilation data, skin conductance data, and/or heart rate data.

In embodiments, adaptation module 124 may compute the engagement measurement based on an engagement score, which may be obtained utilizing one or more of the engagement characteristics depicted in Table 1. As an example, all scores, or any subset thereof, may be joined into a function to calculate an overall engagement score. As an example of this:

Engagement score=$\alpha*pbl+\beta*cf+\gamma*vp+\delta*sc+\epsilon*fe$

Where "pbl" is a positive body language score, "cf" is a consistent focus score, "vp" is a verbal participation score, "sc" is a student confidence score, and "fe" is a fun and excitement or enjoyment score. Each of the engagement characteristics may be multiplied by an engagement coeffimay be between 0 and 1. Further, the engagement coefficients may be selected such that the sum of $\alpha+\beta+\gamma+\delta+\epsilon=1$.

Each one of "pbl," "cf," "vp," "sc," and "fe" may be an independent function that may return a score between 0 to 1, where 1 is fully engaged and 0 is not engaged with regard to the respective engagement characteristic (e.g., if the system inferred that the student is having a lot of fun and he/she is very excited, the function "fe" will return a score of 1). Accordingly, a joint engagement score may be created, where values between 0 and 1 may be obtained.

In embodiments, the "pbl" function—the score of "positive body language"—may be based on an evaluation of measurable external indicators of one's body posture, head pose, and hand gesture.

In embodiments, the "cf" function—the score of "consistent focus"—may be based on eye tracking data. This function may quantify whether a student reads all textual explanations and/or watches relevant videos. Based on eye tracking and gaze data, the system may be able to infer what screen regions the student has focused on and what screen regions have yet to be focused on.

In embodiments, the "vp" function—the score of "verbal participation"—may be related to the quality of "lesson" summary the student handles at the end of each session or other vocal indicators of engagement. In embodiments, this task may be considered as not mandatory, and the score may not be taken into consideration; hence, the coefficient "$\gamma$" may be low.

In embodiments, the "sc" function—the score of "student confidence"—may be based on the number of times the student used the help/scaffolding of a tutor, including machine tutoring, peer tutoring, or expert tutoring.

In embodiments, the "fe" function—the score of "fun and excitement"—may be based on an analysis of one or more metrics of the facial expressions, skin conductance, pupil dilation, or heart rate.

Once an engagement level is determined through any or all of the above discussed methods, the user state data utilized to arrive at the determined engagement level may be incorporated into the user state model at block 248. In some embodiments, incorporation of the current user state data into the evolving user state model may be done in series with the remainder of the operations of adaptation module 124, as depicted in FIG. 2, or in other embodiments, this may be done in parallel. In still other embodiments, incorporation of the current user state data into the evolving user state model may be accomplished by storing all of the user state data in a database to be incorporated into the evolving user state model for the respective user once the current unit or learning object is complete or once the user discontinues use of the adaptive learning platform. In any of these embodiments, incorporation of the current user state data may be accomplished through, for example, the correlation of any combination of factors including, but not limited to, real-time user state data, an engagement level, an instructional content type, and/or transitions from one engagement level to another. The incorporation of user state data with the evolving user state model is discussed in further detail in reference to FIG. 4, below.

At block 250, adaptation module 124 may determine whether the determined engagement level is above a specified threshold. In embodiments, the specified threshold may be the same specified threshold for each user or, in other embodiments, may vary from user to user based on the evolving user state model or data contained within the user profile. In some embodiments, the threshold may be variable. For instance, the threshold may be determined by a previously determined engagement level. As an example, if the user is determined to be at one level of engagement, the next engagement level down from the determined engagement level may be the specified threshold. If the engagement level is above the threshold, the process may proceed to block 254 where it may be determined that the current instructional content type is to be maintained. If the engagement level is below the threshold, the process may proceed to block 252 where the instructional content type may be changed in an effort to increase the user's level of engagement. The change in instructional content type may be to an instructional content type defined in the user profile of the respective user or may be determined based on the evolving user state model. For instance, the user profile may determine a default order in which the instructional content types are to be presented to try and increase the user's level of engagement. This default order may, in some embodiments, be overridden as the evolving user state model evolves and determines a more effective order. For example, the user may start off with a user profile indicating that the default order of instructional content types would be linear then multimedia followed by interactive media; however, the evolving user state model may determine that the user's engagement level increases when the order is multimedia then linear followed by interactive media. Once an instructional content type is determined, it may be output at block 256 to instruction module 128.

Once the instructional content type is output to instruction module 128, instruction module 128 may, at block 208, select an instructional content type based on the output from adaptation module 124. As depicted, instruction module 128 may be configured to present instructional content as linear content 210, multimedia content 212, or interactive media content 214. Linear content 210 may be presented to the user in textual format or other static visual formats. Multimedia content 212 may be presented to the user in a format integrating video and audio, for example. Interactive media content 214 may be presented to the user in the form of interactive tutorials, simulations, games, or other interactive activities. It will be appreciated that these instructional content types are merely illustrative and any type of instructional content is contemplated by this disclosure. Each of these instructional content types may provide users with opportunities to learn the content through various presentations 216-220. These presentations may include providing, or telling (e.g., tell 222, 228, and 234), the user aspects of the chosen instructional content such as, for example, facts, concepts, rules, and/or procedures; showing the user relevant examples demonstrating what the user was told (e.g., show 224, 230, and 236); and giving the user the opportunity to apply the user's newly gained knowledge (e.g., do 226, 232, and 238). Do 226, 232, and 238 may provide the user several opportunities to perform exercises ranging from lower order thinking skills (e.g., level 1 exercises aimed at knowledge, comprehension, and application) to higher order thinking skills (e.g., level 2 exercises aimed at analysis, synthesis, and evaluation). While instruction module 128 is presenting the instructional content to the user, adaptation module 124 may constantly monitor the user's level of engagement through the process described above. If a user's level of engagement drops below the previously described threshold, then adaptation module 124 may cooperate with instruction module 128 to dynamically adapt the instructional content and change the content type from a current content type (e.g., linear content 210) to another content type (e.g., multimedia content 212). This is depicted by the "Engaged?" question between the content type boxes 210-214. As depicted, the instruction module is currently depicted, via the dashed boxes, as presenting linear content at the do stage of content presentation for learning object 1 of unit 1. At block 240, the process may proceed to FIG. 3 depicting an illustrative do stage of content presentation and the interaction of instruction module 128 with adaptation module 124 in such a stage.

FIG. 3 may begin at block 302 coming from FIG. 2. As depicted, instruction module 128 may be configured to present a level 1: exercise 1 to the user at block 304 and may receive a response to the exercise from the user at block 306. After receiving the response from the user, the process may proceed to block 308 where a determination is made as to whether the user's response is correct. If the user's response is correct, then the process may proceed to block 312 where the next exercise, level, learning object, or unit may be initiated. If the user's response is incorrect, then the process may proceed to block 310 where a determination of the user's mastery may be performed or administrative confirmation may be determined. The determination of the user's mastery may be based upon a current score of the user with respect to the current set of exercises. For example, if the user has surpassed a predefined threshold of correct answers, then the user may be determined to be proficient, or have gained a mastery of subject matter, at least to an acceptable level to move on to another challenge. In other embodiments, the administrator, such as a teacher in a classroom setting, may confirm that the user may move on to another challenge. If the result of the determination in block 310 is affirmative, then the process may proceed to block 312 where the next exercise (e.g., up to exercise n at block 314), level, learning object, or unit may be initiated. If the result of block 310 is negative, then the process may cooperate with adaptation module 124 to determine an appropriate action to take with respect to the user, and the process may proceed to block 316. At block 316, the user state data may be analyzed to determine an engagement level. This may be accomplished through any of the methods discussed above in reference to FIG. 2. Once an engagement level is determined, the process may proceed to block 318 where the user state data may be incorporated into the evolving user state model. This may also be accomplished in the same, or a similar, manner as that described above in reference to FIG. 2. At block 320, a determination may be made as to whether the determined engagement level is above a threshold. Again, this may be accomplished through the same, or a similar, manner to that described in FIG. 2. If the user's engagement level is not above the threshold, then the process may proceed to block 322 where adaptation module 124 may cooperate with instruction module 128 at block 321 to adapt the exercise presented to the user to emphasize a portion or portions of the exercise by highlighting, underlining, bolding, or otherwise drawing attention to the portions of the exercise; instructing the user to pay attention to the exercise; or otherwise attempting to increase the user's level of engagement with respect to the exercise at hand. For example, if the exercise is presented in the negative, such as "Which one of the following does not belong?" then adaptation module 124 may cooperate with instruction module 128 to emphasize the "not" in one of the methods mentioned above.

If the user's engagement level is above the threshold, then the process may proceed to block 324 where a type of scaffolding, or tutoring, may be selected. This selection may be based upon the user profile, as discussed above, or may be based on the evolving user state model. For example, the evolving user state model for the respective user may indicate that the user responds well to expert tutoring and may select expert tutoring as a result. In addition, the scaffolding type may also be dependent on a previous scaffolding type used. For example, if the user received machine tutoring previously for this exercise, then adaptation module 124 may determine that a peer tutor or an expert tutor would be more appropriate because the machine tutoring may have been ineffective for this user or this exercise.

Once a type of scaffolding is determined, the process may move to the determined scaffolding type to initiate the scaffolding at blocks 326-330. Machine tutoring may be initiated by adaptation module 124 automatically. For peer tutoring or expert tutoring, the adaptation module may notify the user of a peer tutor or expert tutor to contact or may send a message or notification to a selected peer tutor or expert tutor. In some embodiments, as discussed above, an appropriate peer tutor may be predefined by the user profile of the user. In other embodiments, the peer tutor may be determined dynamically based on peer performance on the exercise or an indicated mastery of the subject matter at issue and/or the current content such that the initiated tutoring may complement the instructional content presented to the user. After the tutoring has completed, the process may return to block 304 where the user may make another attempt at the exercise, or a similar exercise, and the process may repeat.

Figure 4:
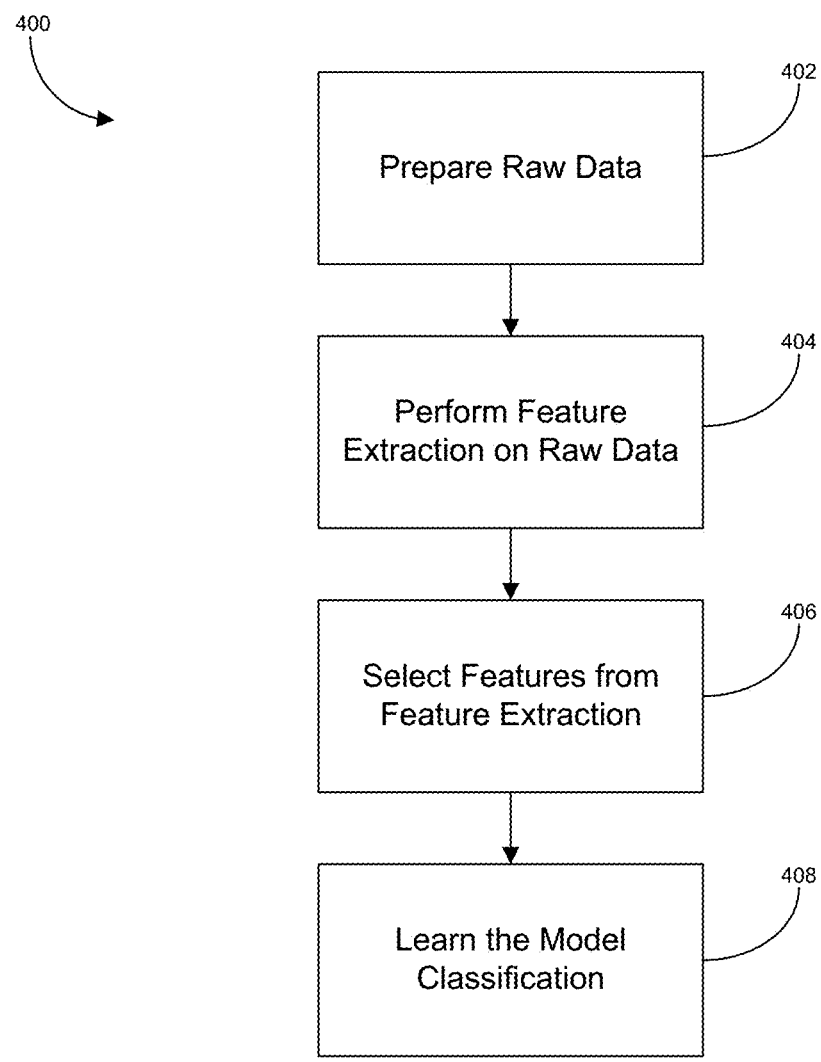
FIG. 4 illustrates a machine classification method for constructing a personalized evolving user state model, in accordance with various embodiments of the present disclosure.

FIG. 4 depicts an illustrative machine classification method for constructing a personalized evolving user state model, in accordance with various embodiments. In embodiments, adaptation module 124 may be configured to score instructional content's impact on engagement of the student by computing the "interestingness" of the content to the student based on gaze based parameters. See details on the parameters below in Table 2. This information, along with the previously discussed user state data, can be used as raw material to compute and/or learn an evolving user state model that may also be customized to interest or types of educational content.

TABLE 2

Digital Content's Impact on Engagement

| Interestingness Criteria | Explanation |
| --- | --- |
| Gaze duration on a tagged object in context of a display or textual element; i.e., proportion of time spent looking at a tagged object in picture or text | The proportion of time looking at a particular tagged object can reflect the "interestingness" of the element to the viewer in context of the display element (photo) or textual element |
| Number of fixations on the area of interest (defining a tagged object) in context of a display element (photo) or textual area; i.e., proportion of fixations on the area of interest of the tagged object versus other area in the photo or text | This metric indicates the "importance/interestingness" of the tagged object to the viewer and is directly related to gaze rate |
| Number of gazes on the area of interest (defining a tagged object) in context of a display element (photo) or text; i.e., proportion of gazes on the area of interest of the tagged object versus other area in the photo or textual area | Number of gazes can be measured as the concatenation of successive fixations within the area of interest (defining a tagged object) and provide an indication of "interestingness" of the object to the viewer |
| Time to first fixation on the area of interest (defining a tagged object) in context of a display element (photo) or textual element | Objects that are seen prior to others will get higher interestingness score |

In some embodiments, the evolving user state model may be learned based on raw data depicted in the data collection and sensors discussion above. In embodiments, adaptation module 124 may be configured to learn an evolving user state model using, for example, a machine learning regression method. In other embodiments, adaptation module 124 may be configured to use a machine learning classification method. This machine learning classification may be accomplished through process 400. Process 400 may begin at block 402, where adaptation module 124 may determine input data, output data, and an engagement function to be optimized. At block 404, adaptation module 124 may perform various feature extraction processes based on various signal processing techniques known in the art to extract features from the input data signals. At block 406, adaptation module 124 may select one or more features based on measures of data correlation or mutual dependence of two pieces of data, also referred to in the art as mutual information or transinformation. The computation may be based on time series data, or a sequence of data points measured at successive points in time that may be spaced at uniform intervals. The feature selection algorithm may be based on any appropriate feature selection algorithm such as, but not limited to, minimum Redundancy Maximum Relevance (mRMR), Fast Correlation Based Filter (FCBF), etc. At block 408, adaptation module 124 may learn the model classification based on learning from good and bad examples by utilizing, for example, Gestalt grouping cues as features, and may also be based on statistical Markov chains or Markov Chain Monte Carlo paradigms. Once the evolving user state model is learned, the evolving user state model may be refined from one learning session to the next by repeating process 400.

Figure 5:
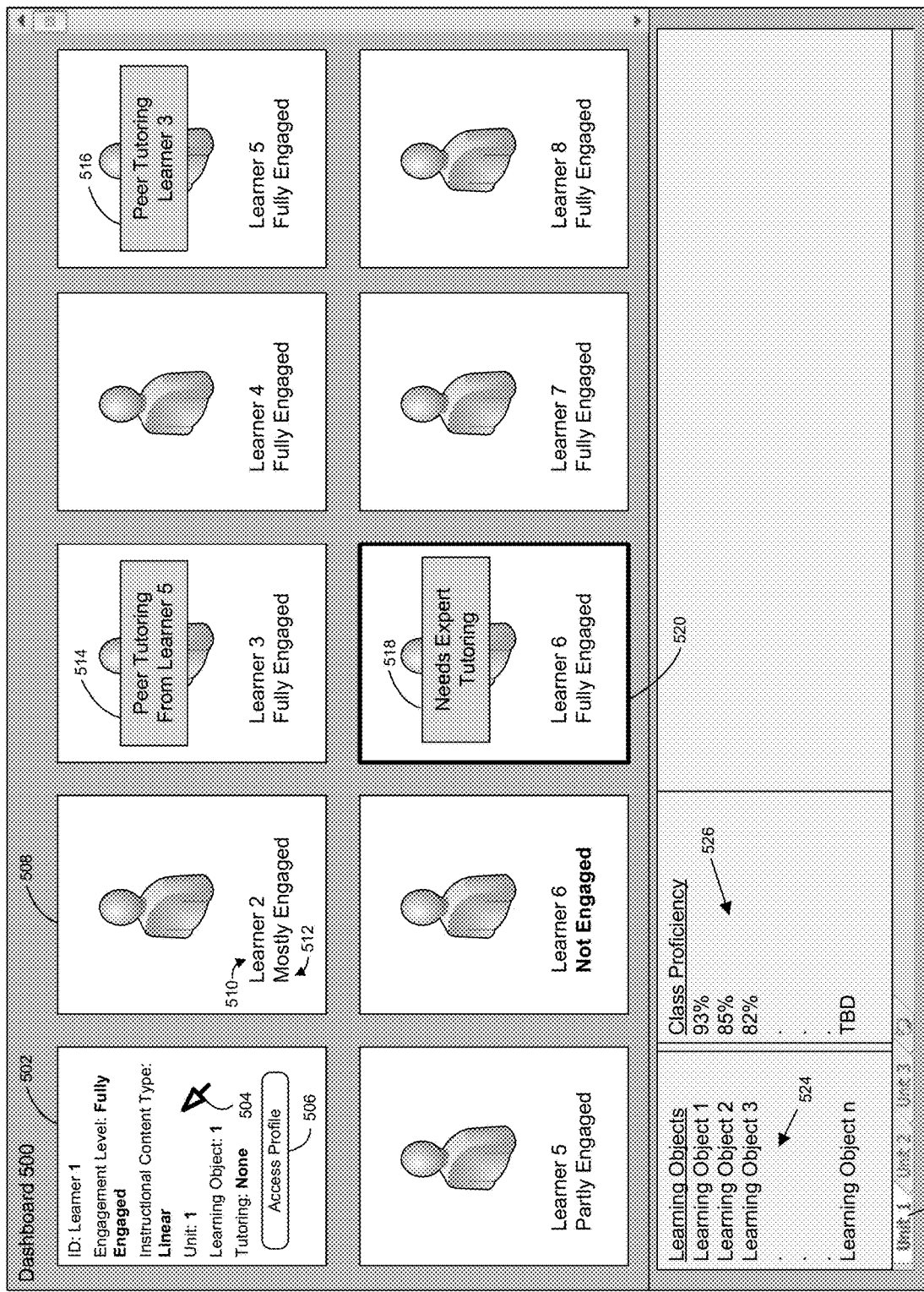
FIG. 5 illustrates an example presentation of an administrative dashboard of an adaptive learning environment, in accordance with various embodiments of the present disclosure.

FIG. 5 illustrates an example presentation of an administrative dashboard 500 of an adaptive learning environment in accordance with various embodiments of the present disclosure. Dashboard 500 may be presented to an administrator of the adaptive learning environment, such as a teacher in a classroom setting. Dashboard 500 may enable the administrator to monitor the engagement level of each individual learner, or student, along with other pertinent information, as well as provide a holistic representation of the class's comprehension. In some embodiments, the dashboard may be configured to present a visual element (e.g., visual element 508) associated with each learner. The visual elements may identity each learner utilizing an identifier such as the learner's name 510 and may also present a real-time indicator of the learner's engagement level 512. In some embodiments, the visual element may also include an image of the learner to enable the administrator to more quickly identify the learner associated with the information contained within the respective visual element.

In some embodiments, the dashboard may be configured to enable the administrator to access more in-depth instructional information associated with the individual learners, such as the more in-depth information presented in visual element 502. Dashboard 500 may be configured to provide this in-depth information as a result of any type of interaction such as, for example, a traditional double-click of a mouse button or merely hovering cursor 504 over the desired visual element. Dashboard 500 may also be configured to provide the administrator access to a profile for the user (e.g., through interaction with button 506), such as the user profile discussed elsewhere herein. Dashboard 500 may also present contextual information (e.g., peer tutoring designations 514 and 516) or notifications of a learner needing expert tutoring (e.g., notification 518). In some embodiments, if the administrator needs to take action with respect to a learner (e.g., expert tutoring), then the visual element may be distinguished in some way, such as through a bolding or emphasis added to the edge of the visual element (e.g., bolded edge 520), or any other mechanism that may draw the administrator's attention to the visual element.

In some embodiments, dashboard 500 may also present a holistic representation of the class's comprehension. In such embodiments, this holistic representation may be broken down by unit and learning object. For example, dashboard 500 may be configured to present a list of learning objects 524 associated with a selected unit 522 and may correlate the list of learning objects 524 with a corresponding list of percentages of proficiency 526. In some embodiments, the administrator may be able to select an individual learning object from the list of learning objects 524 and view statistics, such as individual proficiency indicators, percentages of completion, etc., related to the selected learning object for each individual learner.

Figure 6:
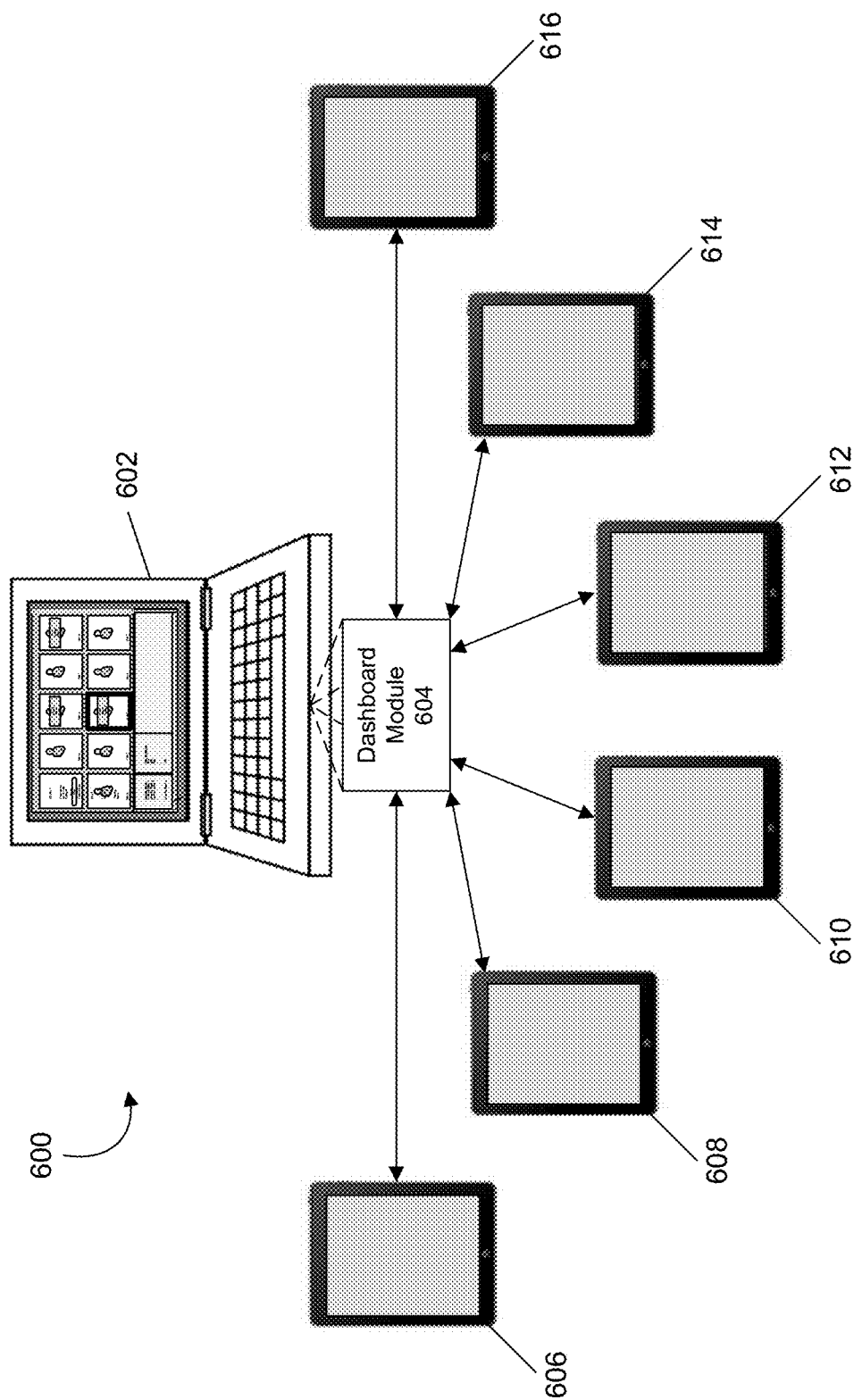
FIG. 6 illustrates an adaptive learning environment having an administrative dashboard, in accordance with various embodiments of the present disclosure.

FIG. 6 illustrates an adaptive learning environment 600 having an administrative dashboard, in accordance with various embodiments of the present disclosure. Adaptive learning environment 600 may include an administrative computing device, such as laptop 602. Adaptive learning environment 600 may also include a number of learner computing devices, such as tablets 606-616, associated with individual learners. The administrative computing device may include a dashboard module 604 configured to present an administrator with a dashboard, such as dashboard 500 of FIG. 5. Dashboard module 604 may be communicatively coupled to the individual learner computing devices via any type of wired or wireless data connection such as, for example, WiFi, Bluetooth, Wireless USB, Ethernet, Internet, local area network, etc. Dashboard module 604 may be configured to receive instructional data from each of the learner computing devices, such as, for example, engagement level, level of comprehension of instructional content, level of completion of instructional content, etc. Dashboard module 604 may be configured to aggregate this instructional data and enable an administrator to monitor the instructional data associated with each individual student as well as a holistic representation of the instructional data for the class as a whole.

Figure 7:
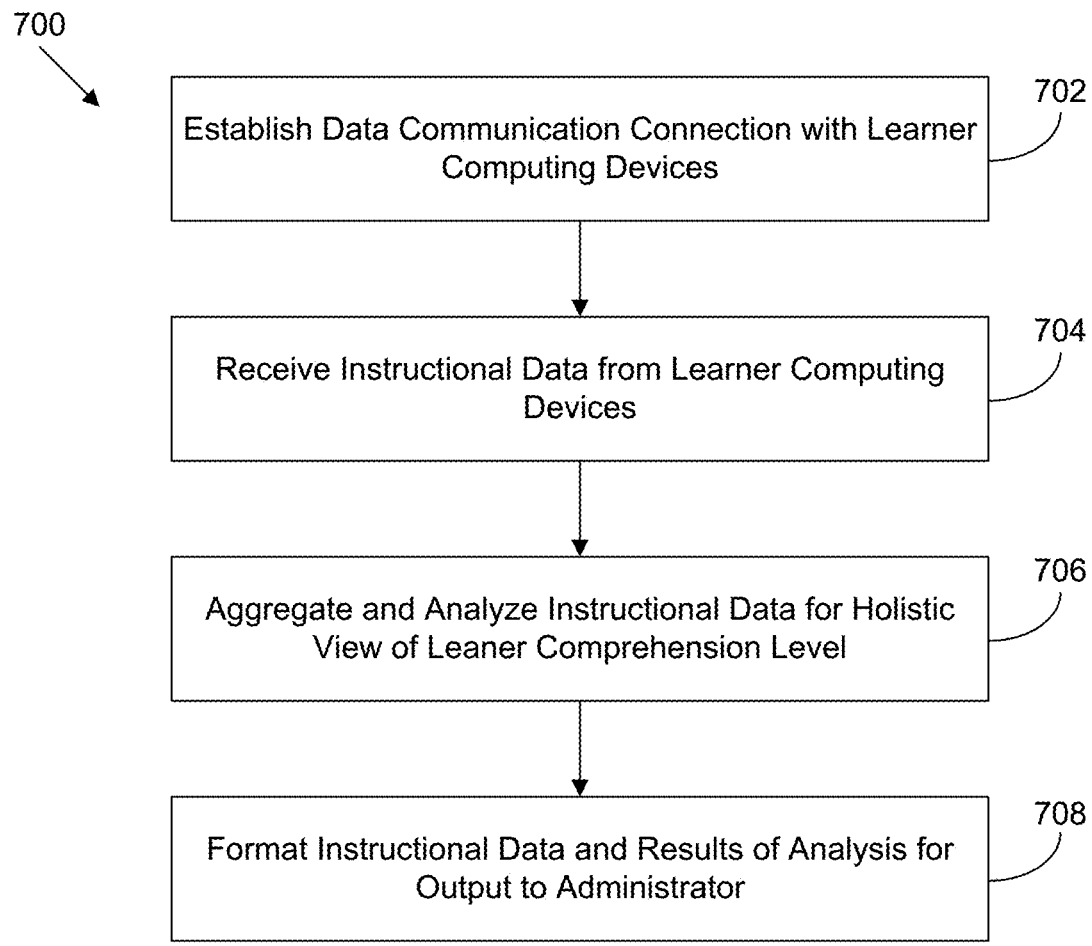
FIG. 7 illustrates a process flow of an administrative dashboard, in accordance with various embodiments of the present disclosure.

FIG. 7 illustrates a process flow 700 of a dashboard module, such as dashboard module 604, in accordance with various embodiments of the present disclosure. The process may begin at operation 702 where a communication connection, such as the data connections discussed in reference to FIG. 6, above, may be established. At block 704, the dashboard module may receive or acquire instructional data from the individual learner computing devices, (e.g., tablets 606-616 of FIG. 6). At block 706, the instructional data may be aggregated and analyzed to generate a holistic view of the individual learner comprehension level as well as the learners as a whole. At block 708, dashboard module 604 may format the instructional data and the results of the analysis of block 706 for output to an administrator.

Figure 8:
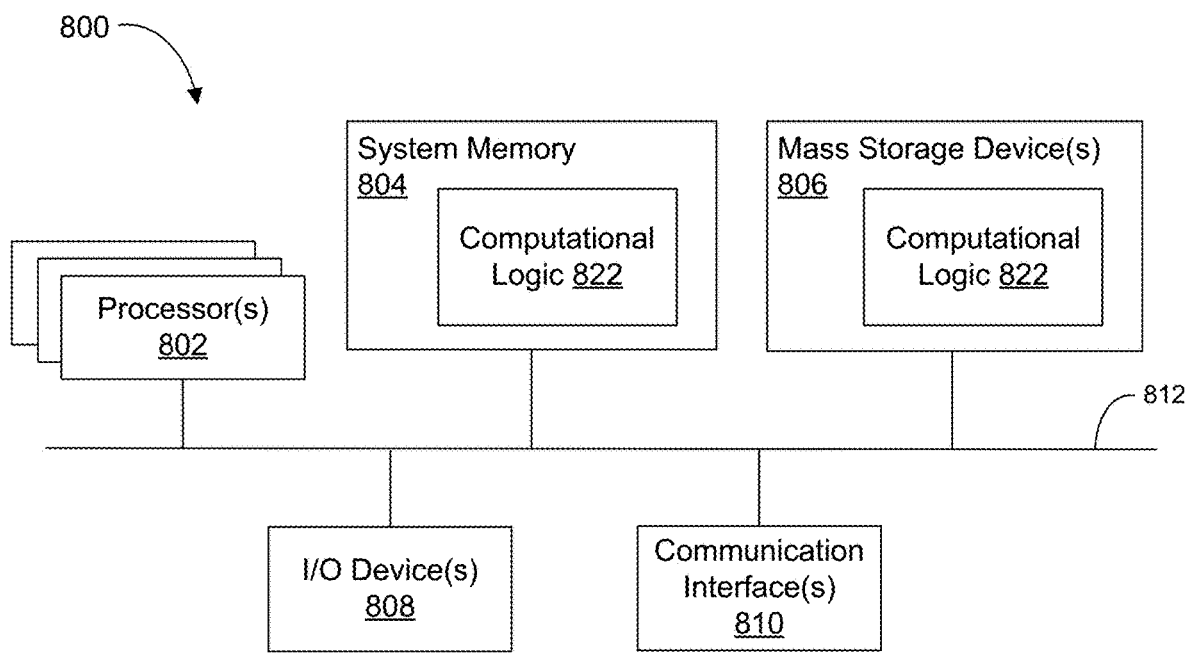
FIG. 8 illustrates a component view of an example computer system suitable for practicing the disclosure, in accordance with various embodiments.

Referring now to FIG. 8, wherein an example computing device suitable to implement an adaptive learning platform 108 or a dashboard 500, in accordance with various embodiments, is illustrated. As shown, computing device 800 may include one or more processors or processor cores 802, and system memory 804. In embodiments, multiple processor cores 802 may be disposed on one die. For the purpose of this application, including the claims, the terms "processor" and "processor cores" may be considered synonymous, unless the context clearly requires otherwise. Additionally, computing device 800 may include mass storage device(s) 806 (such as diskette, hard drive, compact disc read-only memory (CD-ROM), and so forth), input/output (I/O) device(s) 808 (such as display, keyboard, cursor control, and so forth), and communication interfaces 810 (such as network interface cards, modems, and so forth). In embodiments, a display unit may be touch screen sensitive and may include a display screen, one or more processors, storage medium, and communication elements. Further, it may be removably docked or undocked from a base platform having the keyboard. The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device(s) 806 may be employed to store a working copy and a permanent copy of programming instructions implementing the operations described earlier, e.g., but not limited to, operations associated with adaptive learning platform 108 and/or dashboard 500, generally referred to as computational logic 822. The various operations may be implemented by assembler instructions supported by processor(s) 802 or high-level languages, such as, for example, C, that may be compiled into such instructions.

The permanent copy of the programming instructions may be placed into permanent mass storage device(s) 806 in the factory, or in the field, through, for example, a distribution medium (not shown), such as a compact disc (CD), or through communication interface 810 (from a distribution server (not shown)). That is, one or more distribution media having an implementation of adaptive learning platform 108 or dashboard 500 may be employed to distribute the adaptive learning platform or dashboard and program various computing devices.

The number, capability, and/or capacity of these elements 810-812 may vary, depending on the intended use of example computing device 800, e.g., whether example computer 800 is a smartphone, tablet, ultrabook, laptop, or desktop. The constitutions of these elements 810-812 are otherwise known, and accordingly will not be further described.

FIG. 9 illustrates an example non-transitory computer-readable storage medium having instructions configured to practice all or selected ones of the operations associated with adaptive learning platform 108 and/or dashboard 500, earlier described, in accordance with various embodiments. As illustrated, non-transitory computer-readable storage medium 902 may include a number of programming instructions 904. Programming instructions 904 may be configured to enable a device, e.g., computing device 800, in response to execution of the programming instructions, to perform one or more operations of the processes described in reference to FIGS. 1-7. In alternate embodiments, programming instructions 904 may be disposed on multiple non-transitory computer-readable storage media 902 instead. In still other embodiments, programming instructions 904 may be encoded in transitory computer-readable signals.

Referring back to FIG. 8, for one embodiment, at least one of processors 802 may be packaged together with computational logic 822 (in lieu of storing in memory 804 and/or mass storage 806) configured to perform one or more operations of the processes described with reference to FIGS. 1-7. For one embodiment, at least one of processors 802 may be packaged together with computational logic 822 configured to practice aspects of the methods described in reference to FIGS. 1-7 to form a System in Package (SiP). For one embodiment, at least one of processors 802 may be integrated on the same die with computational logic 822 configured to perform one or more operations of the processes described in reference to FIGS. 1-7. For one embodiment, at least one of processors 802 may be packaged together with computational logic 822 configured to perform one or more operations of the process described in reference to FIGS. 1-7 to form a System on Chip (SoC). Such an SoC may be utilized in any suitable computing device.

For the purposes of this description, a computer-usable or computer-readable medium can be any apparatus that can contain, store, communicate, propagate, or transport the program for use by or in connection with an instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W), and digital video disk (DVD).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Thus, an adaptive learning platform that may enhance the learning experience and effectiveness of learning, based at least in part on real-time identification of a user's engagement levels, has been described. Adaptive learning platform 108 may implement a methodology to understand the user's learning state, or engagement level, in real-time based on the user's behavior and/or other contextual indicators such as environmental data, which may give a strong indication of the user's engagement in addition to the user's performance. Adaptive learning platform 108 may be implemented on a computing device setup with integrated relevant sensors, or access to such sensors, for each user in order to holistically understand a learner's mood, attitude toward specific content or representation of content, engagement level, and environmental factors influencing the learner. Adaptive learning platform 108 may seamlessly integrate into a traditional, face-to-face classroom learning environment by incorporating traditional scaffolding mechanisms such as peer and expert tutoring in addition to machine tutoring. Adaptive learning platform 108 may provide a comprehensive administrator, or teacher, a dashboard to communicate information concerning the users under the teacher's control and the class as a whole. This may enable the teacher to monitor real-time data regarding each user's actual learning experience without the need to be one-on-one with the individual users and may enable the teacher to get a deeper insight of the student learning and reaction to the learned material. In addition, this may enable the teacher to have a holistic picture of a comprehension level of the class based on actual user monitoring in addition to, or in place of, mere performance analysis.

EXAMPLES

Some non-limiting examples are:

Example 1 is a computing device for adaptive learning comprising: an instruction module to selectively provide instructional content of one of a plurality of instruction content types to a user of the computing device via one or more output devices coupled with the computing device; and an adaptation module operatively coupled with the instruction module to: determine, in real-time, an engagement level associated with the user of the computing device; and cooperate with the instruction module to dynamically adapt the instructional content provided to the user based at least in part on the engagement level determined.

Example 2 may include the subject matter of Example 1, wherein to determine the engagement level associated with the user is based upon measurable external indicators of one or more of behavioral engagement, cognitive engagement, or emotional engagement.

Example 3 may include the subject matter of Example 2, wherein behavioral engagement corresponds with an amount of effort, persistence, attention, or participation exerted by the user, cognitive engagement corresponds with a commitment by the user to understand the instructional content, or emotional engagement corresponds with feelings of the user with respect to a learning process.

Example 4 may include the subject matter of any one of Examples 1-3, wherein the engagement level is selected from an engagement level group consisting of: fully engaged indicating the user is completely engaged; mostly engaged indicating the user is engaged a majority of the time; partly engaged indicating the user's engagement is unpredictable; fleetingly engaged indicating the user's engagement is low; or not engaged indicating the user is inattentive or unresponsive.

Example 5 may include the subject matter of any one of Examples 1-4, wherein to determine the engagement level is to calculate an engagement score based upon a set of engagement characteristics.

Example 6 may include the subject matter of Example 5, wherein the engagement characteristics include one or more parameters indicative of positive body language, consistent focus, verbal participation, confidence, or enjoyment.

Example 7 may include the subject matter of Example 6, wherein to calculate an engagement score is to multiply a mathematical value associated with each of the engagement characteristics by a respective engagement coefficient associated with the respective engagement characteristic, wherein the engagement coefficient is indicative of a weight to assign to the respective engagement characteristic.

Example 8 may include the subject matter of either of Examples 6 or 7, wherein parameters indicative of positive body language are based on one or more of observed body posture, head pose, or hand gesture; consistent focus is based on eye tracking data; verbal participation is based on a quality of lesson summary or vocal indicators of engagement; student confidence is based on a number of times the user utilizes a tutoring resource; and enjoyment is based on one or more metrics of facial expressions, skin conductance, pupil dilation, or heart rate.

Example 9 may include the subject matter of any one of Examples 1-8, wherein to cooperate with the instruction module to dynamically adapt the instructional content occurs when the engagement level determined indicates a change in the level of engagement of the user from a previous level of engagement.

Example 10 may include the subject matter of any one of Examples 1-8, wherein the instructional content is selected from an instructional content type group consisting of: linear content, multimedia content, or interactive content.

Example 11 may include the subject matter of Example 10, wherein to cooperate with the instruction module to dynamically adapt the instructional content is to cooperate with the instruction module to change the instructional content from a current instructional content selected from the instructional content group to another instructional content selected from the instructional content group, wherein the current instructional content and the another instructional content are different from one another.

Example 12 may include the subject matter of any one of Examples 1-10, wherein to adapt the instructional content is to emphasize a portion of the instructional content to draw the user's attention to the portion of instructional content.

Example 13 may include the subject matter of any one of Examples 1-10, wherein to cooperate with the instruction module is to initiate tutoring of the user to complement the instructional content.

Example 14 may include the subject matter of Example 13, wherein to initiate tutoring of the user is to initiate machine tutoring of the user.

Example 15 may include the subject matter of Example 13, wherein to initiate tutoring of the user is to initiate peer tutoring or expert tutoring of the user.

Example 16 may include the subject matter of Example 15, wherein the computing device further includes a communication module operatively coupled with the adaptation module to communicate with a plurality of other computing devices each associated with either a peer tutor or an expert tutor, and wherein to initiate tutoring of the user is to send a communication to a selected one of the plurality of other computing devices.

Example 17 may include the subject matter of Example 16, wherein the selected one of the plurality of other computing devices is associated with a peer tutor indicated as having a mastery of a subject matter of the instructional content.

Example 18 may include the subject matter of any one of Examples 1-17, wherein the adaptation module is further to receive user state data, and wherein to determine the engagement level is based, at least in part, on the user state data.

Example 19 may include the subject matter of Example 18, wherein the user state data includes one or more of: environmental data associated with an environment in which the user is located, perceptual data associated with a current state of the user, or user profile data associated with characterizing parameters of the user.

Example 20 may include the subject matter of Example 19, further comprising a plurality of sensors to produce at least a portion of the user state data.

Example 21 may include the subject matter of either of Examples 19 or 20, wherein the user state data includes perceptual data, and wherein the perceptual data includes real-time data associated with one or more of: body posture, head pose, hand gestures, eye tracking, facial expressions, skin conductance, pupil dilation, or heart rate.

Example 22 may include the subject matter of any one of Examples 19-21, wherein the user state data includes environmental data, and wherein the environmental data includes data associated with one or more of time, date, lighting conditions, noise level, location, temperature, humidity, or weather conditions.

Example 23 may include the subject matter of any one of Examples 19-22, the adaptation module is further to incorporate user state data into an evolving user state model associated with the user, wherein the evolving user state model is learned from previously collected user state data.

Example 24 may include the subject matter of Example 23, wherein to determine an engagement level is further based on the evolving user state model.

Example 25 is a computer-implemented method for adaptive learning comprising: receiving, by an adaptive learning platform of a computing device, real-time user state data associated with a user of the computing device; determining, by the adaptive learning platform, a current engagement level of the user based, at least in part, on the real-time user state data; and dynamically adapting, by the adaptive learning platform, instructional content output by the adaptive learning platform, based at least in part on the current engagement level.

Example 26 may include the subject matter of Example 25, wherein determining a current engagement level of the user is further based upon measurable external indicators of one or more of behavioral engagement, cognitive engagement, or emotional engagement.

Example 27 may include the subject matter of Example 26, wherein behavioral engagement corresponds with an amount of effort, persistence, attention, or participation exerted by the user, cognitive engagement corresponds with a commitment by the user to understand the instructional content, or emotional engagement corresponds with feelings of the user with respect to a learning process.

Example 28 may include the subject matter of any one of Examples 25-27, wherein the engagement level is selected from an engagement level group consisting of: fully engaged indicating the user is completely engaged; mostly engaged indicating the user is engaged a majority of the time; partly engaged indicating the user's engagement is unpredictable; fleetingly engaged indicating the user's engagement is low; or not engaged indicating the user is inattentive or unresponsive.

Example 29 may include the subject matter of any one of Examples 25-28, wherein determining the engagement level further comprises calculating an engagement score based upon a set of engagement characteristics.

Example 30 may include the subject matter of Example 29, wherein the engagement characteristics include one or more parameters indicative of positive body language, consistent focus, verbal participation, confidence, or enjoyment.

Example 31 may include the subject matter of Example 30, wherein calculating an engagement score further comprises multiplying a mathematical value associated with each of the engagement characteristics by a respective engagement coefficient associated with the respective engagement characteristic, wherein the engagement coefficient is indicative of a weight to assign to the respective engagement characteristic.

Example 32 may include the subject matter of either of Examples 30 or 31, wherein parameters indicative of positive body language are based on one or more of observed body posture, head pose, or hand gesture; consistent focus is based on eye tracking data; verbal participation is based on a quality of lesson summary or vocal indicators of engagement; student confidence is based on a number of times the user utilizes a tutoring resource; and enjoyment is based on one or more metrics of facial expressions, skin conductance, pupil dilation, or heart rate.

Example 33 may include the subject matter of any one of Examples 25-32, wherein dynamically adapting the instructional content further comprises dynamically adapting the instructional content when the engagement level determined indicates a change in the level of engagement of the user from a previous level of engagement.

Example 34 may include the subject matter of any one of Examples 25-32, wherein the instructional content is selected from an instructional content type group consisting of: linear content, multimedia content, or interactive content.

Example 35 may include the subject matter of Example 34, wherein dynamically adapting the instructional content further comprises changing the instructional content from a current instructional content selected from the instructional content group to another instructional content selected from the instructional content group, wherein the current instructional content and the another instructional content are different from one another.

Example 36 may include the subject matter of any one of Examples 25-34, wherein dynamically adapting the instructional content further comprises emphasizing a portion of the instructional content to draw the user's attention to the portion of instructional content.

Example 37 may include the subject matter of any one of Examples 25-34, further comprising initiating tutoring of the user to complement the instructional content.

Example 38 may include the subject matter of Example 37, wherein the tutoring is machine tutoring.

Example 39 may include the subject matter of Example 37, wherein the tutoring is peer tutoring or expert tutoring of the user.

Example 40 may include the subject matter of Example 39, wherein initiating tutoring of the user further comprises sending a notification to a selected computing device of a plurality of computing devices, where the selected computing device is associated with either a peer tutor or an expert tutor selected to tutor the user.

Example 41 may include the subject matter of Example 40, wherein the tutoring is peer tutoring and the selected computing device is associated with a peer tutor indicated as having a mastery of a subject matter of the instructional content.

Example 42 may include the subject matter of any one of Examples 25-41, further comprising receiving user state data, and wherein determining the engagement level is based, at least in part, on the user state data.

Example 43 may include the subject matter of Example 42, wherein the user state data includes one or more of: environmental data associated with an environment in which the user is located, perceptual data associated with a current state of the user, or user profile data associated with characterizing parameters of the user.

Example 44 may include the subject matter of Example 43, wherein receiving user state data further comprises receiving at least a portion of the user state data from a plurality of sensors.

Example 45 may include the subject matter of either of Examples 43 or 44, wherein the user state data includes perceptual data, and wherein the perceptual data includes real-time data associated with one or more of: body posture, head pose, hand gestures, eye tracking, facial expressions, skin conductance, pupil dilation, or heart rate.

Example 46 may include the subject matter of any one of Examples 43-45, wherein the user state data includes environmental data, and wherein the environmental data includes data associated with one or more of time, date, lighting conditions, noise level, location, temperature, humidity, or weather conditions.

Example 47 may include the subject matter of any one of Examples 43-46, further comprising incorporating the user state data into an evolving user state model with the user, wherein the evolving user state model is learned from previously collected user state data.

Example 48 may include the subject matter of Example 47, wherein determining an engagement level is further based on the evolving user state model.

Example 49 is one or more computer-readable storage media having a plurality of instructions stored thereon, which, when executed by a processor of a computing device, provide the computing device with an adaptive learning platform to: receive real-time user state data associated with a user of the computing device; determine a current engagement level of the user based, at least in part, on the real-time user state data; and dynamically adapt instructional content output by the adaptive learning platform, based at least in part on the current engagement level.

Example 50 may include the subject matter of Example 49, wherein to determine the current engagement level of the user is further based upon measurable external indicators of one or more of behavioral engagement, cognitive engagement, or emotional engagement.

Example 51 may include the subject matter of Example 50, wherein behavioral engagement corresponds with an amount of effort, persistence, attention, or participation exerted by the user, cognitive engagement corresponds with a commitment by the user to understand the instructional content, or emotional engagement corresponds with feelings of the user with respect to a learning process.

Example 52 may include the subject matter of any one of Examples 49-51, wherein the engagement level is selected from an engagement level group consisting of: fully engaged indicating the user is completely engaged; mostly engaged indicating the user is engaged a majority of the time; partly engaged indicating the user's engagement is unpredictable; fleetingly engaged indicating the user's engagement is low; or not engaged indicating the user is inattentive or unresponsive.

Example 53 may include the subject matter of any one of Examples 49-52, wherein to determine the engagement level further comprises calculation of an engagement score based upon a set of engagement characteristics.

Example 54 may include the subject matter of Example 53, wherein the engagement characteristics include one or more parameters indicative of positive body language, consistent focus, verbal participation, confidence, or enjoyment.

Example 55 may include the subject matter of Example 54, wherein calculation of an engagement score further comprises multiplication of a mathematical value associated with each of the engagement characteristics by a respective engagement coefficient associated with the respective engagement characteristic, wherein the engagement coefficient is indicative of a weight to assign to the respective engagement characteristic.

Example 56 may include the subject matter of either of Examples 54 or 55, wherein parameters indicative of positive body language are based on one or more of observed body posture, head pose, or hand gesture; consistent focus is based on eye tracking data; verbal participation is based on a quality of lesson summary or vocal indicators of engagement; student confidence is based on a number of times the user utilizes a tutoring resource; and enjoyment is based on one or more metrics of facial expressions, skin conductance, pupil dilation, or heart rate.

Example 57 may include the subject matter of any one of Examples 49-56, wherein to dynamically adapt the instructional content further comprises dynamically adapt the instructional content when the engagement level determined indicates a change in the level of engagement of the user from a previous level of engagement.

Example 58 may include the subject matter of any one of Example 49-56, wherein the instructional content is selected from an instructional content type group consisting of: linear content, multimedia content, or interactive content.

Example 59 may include the subject matter of Example 58, wherein to dynamically adapt the instructional content further comprises a change of the instructional content from a current instructional content selected from the instructional content group to another instructional content selected from the instructional content group, wherein the current instructional content and the another instructional content are different from one another.

Example 60 may include the subject matter of any one of Examples 49-58, wherein to dynamically adapt the instructional content further comprises emphasizing a portion of the instructional content to draw the user's attention to the portion of instructional content.

Example 61 may include the subject matter of any one of Examples 49-58, wherein the adaptive learning platform is further to initiate tutoring of the user to complement the instructional content.

Example 62 may include the subject matter of Example 61, wherein the tutoring is machine tutoring.

Example 63 may include the subject matter of Example 61, wherein the tutoring is peer tutoring or expert tutoring of the user.

Example 64 may include the subject matter of Example 63, wherein to initiate tutoring of the user further comprises transmission of a notification to a selected computing device of a plurality of computing devices, where the selected computing device is associated with either a peer tutor or an expert tutor selected by the adaptive learning platform to tutor the user.

Example 65 may include the subject matter of Example 64, wherein the tutoring is peer tutoring and the selected computing device is associated with a peer tutor indicated as having a mastery of a subject matter of the instructional content.

Example 66 may include the subject matter of Example 49-65, wherein the adaptive learning platform is further to receive user state data, and wherein to determine the engagement level is based, at least in part, on the user state data.

Example 67 may include the subject matter of Example 66, wherein the user state data includes one or more of: environmental data associated with an environment in which the user is located, perceptual data associated with a current state of the user, or user profile data associated with characterizing parameters of the user.

Example 68 may include the subject matter of Example 67, wherein to receive user state data further comprises receipt of at least a portion of the user state data from a plurality of sensors.

Example 69 may include the subject matter of either of Examples 67 or 68, wherein the user state data includes perceptual data, and wherein the perceptual data includes real-time data associated with one or more of: body posture, head pose, hand gestures, eye tracking, facial expressions, skin conductance, pupil dilation, or heart rate.

Example 70 may include the subject matter of any one of Examples 67-69, wherein the user state data includes environmental data, and wherein the environmental data includes data associated with one or more of time, date, lighting conditions, noise level, location, temperature, humidity, or weather conditions.

Example 71 may include the subject matter of any one of Examples 67-70, wherein the adaptive learning platform is further to incorporate the user state data into an evolving user state model associated with the user, wherein the evolving user state model is learned from previously collected user state data.

Example 72 may include the subject matter of Example 71, wherein to determine an engagement level is further based on the evolving user state model.

Example 73 is a computing device for adaptive learning comprising: a communication module to communicatively couple the computing device with a plurality of other computing devices respectively associated with a plurality of students; and a dashboard module to receive instructional data from the plurality of other computing devices indicating at least a real-time engagement level of each individual student of the plurality of students and enable a user of the computing device to monitor the engagement level of each individual student.

Example 74 may include the subject matter of Example 73, wherein the dashboard module is further to analyze and aggregate the instructional data to generate a holistic representation of class comprehension associated with instructional content presented to the plurality of students.

Example 75 may include the subject matter of either of Examples 73 or 74, wherein the dashboard module is further to: receive an indicator that one or more students is in need of tutoring from respective one or more of the plurality of computing devices; and notify the user of the computing device that the one or more students are in need of tutoring.

Example 76 may include the subject matter of Example 75, wherein the tutoring is expert tutoring and the user is to provide the expert tutoring.

Example 77 may include the subject matter of any one of Examples 74-76, wherein the dashboard module is further to: receive an indicator of a tutoring status associated with one or more of the students; and format and output the status for display to the user.

Example 78 may include the subject matter of Example 77, wherein the tutoring status indicates that the student is either in the process of being tutored or in the process of tutoring another student.

Example 79 is a method for monitoring an engagement level comprising: establishing, by a dashboard module of an administrator computing device, a data communication connection with a plurality of student computing devices associated with respective students; and receiving, by the dashboard module, instructional data from the plurality of student computing devices indicating at least a real-time engagement level of each individual student associated with the plurality of student computing devices; and enabling, by the dashboard module, a user of the administrator computing device to monitor the engagement level of the individual students.

Example 80 may include the subject matter of Example 79, further comprising analyzing and aggregating, by the dashboard module, the instructional data to generate a holistic representation of class comprehension associated with instructional content presented to the plurality of students.

Example 81 may include the subject matter of either of Examples 79 or 80, further comprising: receiving an indicator that one or more students is in need of tutoring from respective one or more of the plurality of computing devices; and notifying the user of the computing device that the one or more students are in need of tutoring.

Example 82 may include the subject matter of Example 81, wherein the tutoring is expert tutoring and the user is to provide the expert tutoring.

Example 83 may include the subject matter of either of Examples 80-82, further comprising: receiving an indicator of a tutoring status associated with one or more of the students; and formatting and outputting the status for display to the user.

Example 84 may include the subject matter of Example 83, wherein the tutoring status indicates that the student is either in the process of being tutored or in the process of tutoring another student.

Example 85 is one or more computer-readable storage media having a plurality of instructions embodied thereon which, when executed by a computing device, cause the computing device to perform the method of any one of claims 79-84.

Example 86 is a computing device for monitoring engagement levels of a user comprising: means for establishing a data communication connection with a plurality of student computing devices associated with respective students; and means for receiving instructional data from the plurality of student computing devices indicating at least a real-time engagement level of each individual student associated with the plurality of student computing devices; and means for enabling a user of the administrator computing device to monitor the engagement level of the individual students.

Example 87 may include the subject matter of Example 86, further comprising means for analyzing and aggregating, by the dashboard module, the instructional data to generate a holistic representation of class comprehension associated with instructional content presented to the plurality of students.

Example 88 may include the subject matter of either of Examples 86 or 87, further comprising: means for receiving an indicator that one or more students is in need of tutoring from respective one or more of the plurality of computing devices; and means for notifying the user of the computing device that the one or more students are in need of tutoring.

Example 89 may include the subject matter of Example 88, wherein the tutoring is expert tutoring and the user is to provide the expert tutoring.

Example 90 may include the subject matter of any one of Examples 87-89, further comprising: means for receiving an indicator of a tutoring status associated with one or more of the students; and means for formatting and outputting the status for display to the user.

Example 91 may include the subject matter of Example 90, wherein the tutoring status indicates that the student is either in the process of being tutored or in the process of tutoring another student.

Example 92 is an apparatus for adaptive learning comprising: means for receiving real-time user state data associated with a user of the computing device; means for determining a current engagement level of the user based, at least in part, on the real-time user state data; and means for dynamically adapting instructional content output by the apparatus, based at least in part on the current engagement level.

Example 93 may include the subject matter of Example 92, wherein determining a current engagement level of the user is further based upon measurable external indicators of one or more of behavioral engagement, cognitive engagement, or emotional engagement.

Example 94 may include the subject matter of Example 93, wherein behavioral engagement corresponds with an amount of effort, persistence, attention, or participation exerted by the user, cognitive engagement corresponds with a commitment by the user to understand the instructional content, or emotional engagement corresponds with feelings of the user with respect to a learning process.

Example 95 may include the subject matter of Example 92, wherein the engagement level is selected from an engagement level group consisting of: fully engaged indicating the user is completely engaged; mostly engaged indicating the user is engaged a majority of the time; partly engaged indicating the user's engagement is unpredictable; fleetingly engaged indicating the user's engagement is low; or not engaged indicating the user is inattentive or unresponsive.

Example 96 may include the subject matter of Example 92, wherein determining the engagement level further comprises calculating an engagement score based upon a set of engagement characteristics.

Example 97 may include the subject matter of Example 96, wherein the engagement characteristics include one or more parameters indicative of positive body language, consistent focus, verbal participation, confidence, or enjoyment.

Example 98 may include the subject matter of Example 97, wherein calculating an engagement score further comprises multiplying a mathematical value associated with each of the engagement characteristics by a respective engagement coefficient associated with the respective engagement characteristic, wherein the engagement coefficient is indicative of a weight to assign to the respective engagement characteristic.

Example 99 may include the subject matter of Example 97, wherein parameters indicative of positive body language are based on one or more of observed body posture, head pose, or hand gesture; consistent focus is based on eye tracking data; verbal participation is based on a quality of lesson summary or vocal indicators of engagement; student confidence is based on a number of times the user utilizes a tutoring resource; and enjoyment is based on one or more metrics of facial expressions, skin conductance, pupil dilation, or heart rate.

Example 100 may include the subject matter of Example 92, wherein means for dynamically adapting the instructional content further comprises means for dynamically adapting the instructional content when the engagement level determined indicates a change in the level of engagement of the user from a previous level of engagement.

Example 101 may include the subject matter of Example 92, wherein the instructional content is selected from an instructional content type group consisting of: linear content, multimedia content, or interactive content.

Example 102 may include the subject matter of Example 101, wherein means for dynamically adapting the instructional content further comprises means for changing the instructional content from a current instructional content selected from the instructional content group to another instructional content selected from the instructional content group, wherein the current instructional content and the another instructional content are different from one another.

Example 103 may include the subject matter of Example 92, wherein means for dynamically adapting the instructional content further comprises means for emphasizing a portion of the instructional content to draw the user's attention to the portion of instructional content.

Example 104 may include the subject matter of Example 92, further comprising means for initiating tutoring of the user to complement the instructional content.

Example 105 may include the subject matter of Example 104, wherein the tutoring is machine tutoring.

Example 106 may include the subject matter of Example 104, wherein the tutoring is peer tutoring or expert tutoring of the user.

Example 107 may include the subject matter of Example 106, wherein initiating tutoring of the user further comprises sending a notification to a selected computing device of a plurality of computing devices, where the selected computing device is associated with either a peer tutor or an expert tutor selected to tutor the user.

Example 108 may include the subject matter of Example 107, wherein the tutoring is peer tutoring and the selected computing device is associated with a peer tutor indicated as having a mastery of a subject matter of the instructional content.

Example 109 may include the subject matter of any one of Examples 92-108, further comprising means for receiving user state data, and wherein determining the engagement level is based, at least in part, on the user state data.

Example 110 may include the subject matter of Example 109, wherein the user state data includes one or more of: environmental data associated with an environment in which the user is located, perceptual data associated with a current state of the user, or user profile data associated with characterizing parameters of the user.

Example 111 may include the subject matter of Example 110, wherein receiving user state data further comprises receiving at least a portion of the user state data from a plurality of sensors.

Example 112 may include the subject matter of Example 110, wherein the user state data includes perceptual data, and wherein the perceptual data includes real-time data associated with one or more of: body posture, head pose, hand gestures, eye tracking, facial expressions, skin conductance, pupil dilation, or heart rate.

Example 113 may include the subject matter of Example 110, wherein the user state data includes environmental data, and wherein the environmental data includes data associated with one or more of time, date, lighting conditions, noise level, location, temperature, humidity, or weather conditions.

Example 114 may include the subject matter of Example 110, further comprising means for incorporating the user state data into an evolving user state model associated with the user, wherein the evolving user state model is learned from previously collected user state data.

Example 115 may include the subject matter of Example 114, wherein determining an engagement level is further based on the evolving user state model.

What is claimed is:

1. A computing device comprising:
an instruction module to selectively provide instructional content of one of a plurality of instructional content types to a user of the computing device via one or more output devices coupled with the computing device; and
an adaptation module operatively coupled with the instruction module to:
determine, in real-time, an engagement level associated with the user of the computing device, the engagement level based upon measurable external indicators of one or more of behavioral engagement, cognitive engagement, or emotional engagement; and
cooperate with the instruction module to dynamically adapt the instructional content, by changing a type of the instructional content, provided to the user based at least in part on the engagement level determined, wherein the engagement level is further based at least in part on a calculation of interestingness of the instructional content to the user, the calculation based on gaze based parameters of the user as to one or more pre-defined areas of interest of the provided instructional content to the user, and wherein the type of the instructional content is selected from interactive and non-interactive types of content.

2. The computing device of claim 1, wherein behavioral engagement corresponds with an amount of effort, persistence, attention, or participation exerted by the user, cognitive engagement corresponds with a commitment by the user to understand the instructional content, and emotional engagement corresponds with feelings of the user with respect to a learning process.

3. The computing device of claim 1, wherein the engagement level is selected from one of the following engagement levels:
fully engaged, indicating the user is completely engaged;
mostly engaged, indicating the user is engaged a majority of the time;
partly engaged, indicating the user's engagement is unpredictable;
fleetingly engaged, indicating the user's engagement is low; or
not engaged, indicating the user is inattentive or unresponsive.

4. The computing device of claim 1, wherein to determine the engagement level includes to calculate an engagement score based upon a set of engagement characteristics, and wherein the engagement characteristics are indicative of positive body language, consistent focus, verbal participation, confidence, or enjoyment.

5. The computing device of claim 4, wherein to calculate an engagement score includes to multiply a mathematical value associated with each of the engagement characteristics by a respective engagement coefficient associated with the respective engagement characteristic, wherein the engagement coefficient is indicative of a weight to assign to the respective engagement characteristic.

6. The computing device of claim 4, wherein an engagement characteristic indicative of:
positive body language is based on one or more of observed body posture, head pose, or hand gesture;
consistent focus is based on eye tracking data;
verbal participation is based on a quality of lesson summary or vocal indicators of engagement;
student confidence is based on a number of times the user utilizes a tutoring resource; and
enjoyment is based on one or more metrics of facial expressions, skin conductance, pupil dilation, or heart rate.

7. One or more computer-readable storage media having a plurality of instructions stored thereon, which, when executed by a processor of a computing device, provide the computing device with an adaptive learning platform to:
receive real-time user state data associated with a user of the computing device;
determine a current engagement level of the user based, at least in part, on the real-time user state data; and
dynamically adapt instructional content output by the adaptive learning platform, by changing a type of the instructional content, based at least in part on the current engagement level,
wherein the user state data includes one or more of:
environmental data associated with an environment in which the user is located,
perceptual data associated with a current state of the user, or
user profile data associated with characterizing parameters of the user; and
wherein the engagement level is further based at least in part on a calculation of interestingness of the instructional content to the user, the calculation based on gaze based parameters of the user as to one or more pre-defined areas of interest of the provided instructional content to the user, and
wherein the type of the instructional content is selected from interactive and non-interactive types of content.

8. The computer-readable media of claim 7, wherein the user state data includes perceptual data, and wherein the perceptual data includes real-time data associated with one or more of: body posture, head pose, hand gestures, eye tracking, facial expressions, skin conductance, pupil dilation, or heart rate.

9. The computer-readable media of claim 7, wherein the user state data includes environmental data, and wherein the environmental data includes data associated with one or more of time, date, lighting conditions, noise level, location, temperature, humidity, or weather conditions.

10. The computer-readable media of claim 7, wherein the adaptive learning platform is further to incorporate the user state data into an evolving user state model associated with the user, wherein the evolving user state model is learned from previously collected user state data.

11. The computer-readable media of claim 10, wherein to determine an engagement level is further based on the evolving user state model.

12. The computer-readable media of claim 7, wherein the instructional content is selected from an instructional content type group consisting of: linear content, multimedia content, or interactive content.

13. The computer-readable media of claim 12, wherein the plurality of instructions, when executed, are further to:
change the instructional content from a current instructional content selected from the instructional content group to another instructional content selected from the instructional content group, wherein the current instructional content and the another instructional content are different from one another.

14. The computer-readable media of claim 7, wherein the plurality of instructions, when executed, are further to emphasize a portion of the instructional content to draw the user's attention to the portion of instructional content.

15. The computer-readable media of claim 7, wherein the plurality of instructions, when executed, are further to initiate tutoring of the user to complement the instructional content, wherein the tutoring of the user it at least one of machine tutoring, peer tutoring or expert tutoring.

16. The computer-readable media of claim 15, wherein the tutoring is peer tutoring or expert tutoring, and wherein to initiate tutoring of the user further comprises to send a notification to a selected computing device of a plurality of computing devices, the selected computing device being associated with either a peer tutor or an expert tutor selected to tutor the user.

17. The computer-readable media of claim 16, wherein the tutoring is peer tutoring and the selected computing device is associated with a peer tutor indicated as having a mastery of a subject matter of the instructional content.

18. A computing device comprising:
a communication module to communicatively couple the computing device with a plurality of other computing devices each respectively associated with an individual of a plurality of students; and a dashboard module to receive instructional data from the plurality of other computing devices indicating at least a real-time engagement level of each individual of the plurality of students and enable a user of the computing device to monitor the engagement level of each individual student, wherein the real-time engagement level is further based at least in part on a calculation of interestingness of instructional content to each individual of the plurality of students, the calculation based on gaze based parameters of each individual as to one or more pre-defined areas of interest of the instructional content, and wherein a type of the instructional content is selected from interactive and non-interactive types of content based at least in part on the real-time engagement level.

19. The computing device of claim 18, wherein the dashboard module is further to analyze and aggregate the instructional data to generate a holistic representation of class comprehension associated with instructional content presented to the plurality of students.

20. The computing device of claim 18, wherein the dashboard module is further to:
  receive an indicator that one or more students is in need of tutoring from respective one or more of the plurality of computing devices; and
  notify each user of the one or more computing devices that student associated with the computing device is in need of tutoring.

* * * * *